United States Patent
Maruyama et al.

(10) Patent No.: US 10,270,991 B2
(45) Date of Patent: Apr. 23, 2019

(54) IMAGE PROCESSING APPARATUS, IMAGE PROCESSING METHOD, AND COMPUTER-READABLE RECORDING MEDIUM

(71) Applicant: OLYMPUS CORPORATION, Tokyo (JP)

(72) Inventors: Hiroki Maruyama, Hino (JP); Manabu Ichikawa, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 63 days.

(21) Appl. No.: 15/705,960

(22) Filed: Sep. 15, 2017

(65) Prior Publication Data
US 2018/0007293 A1 Jan. 4, 2018

Related U.S. Application Data

(63) Continuation of application No. PCT/JP2015/057958, filed on Mar. 17, 2015.

(51) Int. Cl.
*H04N 5/357* (2011.01)
*H04N 1/409* (2006.01)
(Continued)

(52) U.S. Cl.
CPC ............ *H04N 5/357* (2013.01); *G06T 5/002* (2013.01); *H04N 1/409* (2013.01); *H04N 5/217* (2013.01);
(Continued)

(58) Field of Classification Search
CPC .......... H04N 1/409; H04N 5/21; H04N 5/217; H04N 5/23203; H04N 5/357;
(Continued)

(56) References Cited

U.S. PATENT DOCUMENTS

| | | | |
|---|---|---|---|
| 8,451,351 B2 * | 5/2013 | Kitani | H04N 5/2355 348/246 |
| 2008/0117318 A1 * | 5/2008 | Aoki | H04N 5/367 348/246 |

(Continued)

FOREIGN PATENT DOCUMENTS

| | | |
|---|---|---|
| JP | 2008-245121 A | 10/2008 |
| JP | 2010-103855 A | 5/2010 |

(Continued)

OTHER PUBLICATIONS

Extended Supplementary European Search Report dated Oct. 8, 2018 in European Patent Application No. 15 88 5421.6.

(Continued)

*Primary Examiner* — Lin Ye
*Assistant Examiner* — Chriss S Yoder, III
(74) *Attorney, Agent, or Firm* — Scully, Scott, Murphy & Presser, P.C.

(57) ABSTRACT

Provided is an image processing apparatus for correcting blinking defect noise contained in image data generated by an image sensor. The image sensor includes a pixels arranged two-dimensionally and reading circuits configured to read a pixel value. The image processing apparatus includes: an information acquisition unit configured to acquire noise information that is defined by associating positional information of the reading circuits or positional information of each of the pixels with feature data related to the blinking defect noise caused by the reading circuits; an estimation unit configured to estimate a random noise amount in a pixel of interest based on the feature data and a random noise model for estimating the random noise amount in the pixel of interest; and a correction unit configured to correct a pixel value of the pixel of interest based (Continued)

on the random noise amount estimated by the estimation unit.

19 Claims, 16 Drawing Sheets

(51) Int. Cl.
    *H04N 5/378*         (2011.01)
    *G06T 5/00*          (2006.01)
    *H04N 5/367*         (2011.01)
    *H04N 5/217*         (2011.01)

(52) U.S. Cl.
    CPC ........... *H04N 5/3575* (2013.01); *H04N 5/367* (2013.01); *H04N 5/378* (2013.01); *G06T 2207/10004* (2013.01)

(58) Field of Classification Search
    CPC ...... H04N 5/3575; H04N 5/367; H04N 5/378; G06T 5/002; G06T 2207/10004
    See application file for complete search history.

(56) References Cited

U.S. PATENT DOCUMENTS

| 2011/0080505 A1* | 4/2011 | Ogino | H04N 5/365 348/246 |
|---|---|---|---|
| 2012/0105689 A1 | 5/2012 | Kitani | |
| 2012/0273655 A1 | 11/2012 | Ise | |

FOREIGN PATENT DOCUMENTS

| JP | 2012-105063 | * | 5/2012 |
|---|---|---|---|
| JP | 2012-105063 A | | 5/2012 |
| JP | 2012-231333 A | | 11/2012 |
| JP | 2013-219665 A | | 10/2013 |
| JP | 2014-212450 A | | 11/2014 |

OTHER PUBLICATIONS

International Search Report dated Apr. 21, 2015 issued in PCT/JP2015/057958.

* cited by examiner

IMAGE PROCESSING APPARATUS, IMAGE PROCESSING METHOD, AND COMPUTER-READABLE RECORDING MEDIUM

CROSS REFERENCES TO RELATED APPLICATIONS

This application is a continuation of PCT international application Ser. No. PCT/JP2015/057958, filed on Mar. 17, 2015 which designates the United States, incorporated herein by reference.

BACKGROUND

1. Technical Field

The disclosure relates to an image processing apparatus, an image processing method, and a computer-readable recording medium for correcting blinking defect noise in which a pixel value fluctuates within a certain range due to RTS noise occurring in an image sensor having a plurality of pixels arranged two-dimensionally.

2. Related Art

In recent years, in image sensors such as a complementary metal oxide Semiconductor (CMOS), miniaturization of each pixel and a reading circuit for reading a signal from the pixel has been developed. Such miniaturization causes reduction in sensitivity and increase in various noises. For the reduction in sensitivity, by adopting a shared pixel structure in which a plurality of pixels is shared by a single reading circuit to read a signal, the area required for the circuit in the image sensor is reduced. The sensitivity is improved by improving an aperture ratio (proportion of a light receiving unit) of each pixel.

Examples of noise occurred in the image sensor include dark current shot noise due to dark current, random noise due to thermal noise in the reading circuit, a defective pixel in which a pixel value always shows an abnormal value, and blinking defect noise causing a pixel value to randomly fluctuate. Such blinking defect noise includes random telegraph signal (RTS) noise caused by the reading circuit. As a technology for correcting this RTS noise, there is known a technique in which based on the pixel value of a pixel of interest in a captured image, the pixel value of the surrounding pixel of the pixel of interest, and the noise level of RTS noise (hereinafter referred to as "RTS noise level") detected in advance for each pixel of the image sensor, it is determined whether or not there is an influence of the RTS noise on the pixel of interest, and when it is determined that there is an influence of RTS noise, only the RTS noise level is added or subtracted from the pixel value of the pixel of interest (see JP 2012-105063 A).

SUMMARY

In some embodiments, provided is an image processing apparatus for correcting blinking defect noise contained in image data generated by an image sensor. The image sensor includes: a plurality of pixels arranged two-dimensionally and configured to receive light to generate a signal in accordance with an amount of the received light; and a plurality of reading circuits configured to read the signal as a pixel value. The image processing apparatus includes: an information acquisition unit configured to acquire noise information that is defined by associating positional information of the plurality of reading circuits or positional information of each of the plurality of pixels with feature data related to the blinking defect noise caused by the plurality of reading circuits; an estimation unit configured to estimate a random noise amount in a pixel of interest based on the feature data acquired by the information acquisition unit and a random noise model for estimating the random noise amount in the pixel of interest; and a correction unit configured to correct a pixel value of the pixel of interest based on the random noise amount estimated by the estimation unit.

In some embodiments, an image processing method is executed by an image processing apparatus for correcting blinking defect noise contained in image data generated by an image sensor. The image sensor includes: a plurality of pixels arranged two-dimensionally and configured to receive light to generate a signal in accordance with an amount of the received light; and a plurality of reading circuits configured to read the signal as a pixel value. The method includes: acquiring noise information that is defined by associating positional information of the plurality of reading circuits or positional information of each of the plurality of pixels with feature data related to the blinking defect noise caused by the plurality of reading circuits; estimating a random noise amount in a pixel of interest based on the feature data and a random noise model for estimating the random noise amount in the pixel of interest; and correcting a pixel value of the pixel of interest based on the random noise amount.

In some embodiments, provided is a non-transitory computer-readable recording medium with an executable program stored thereon to be executed by an image processing apparatus an image processing apparatus for correcting blinking defect noise contained in image data generated by an image sensor. The image sensor includes: a plurality of pixels arranged two-dimensionally and configured to receive light to generate a signal in accordance with an amount of the received light; and a plurality of reading circuits configured to read the signal as a pixel value. The program causes the image processing apparatus to execute: acquiring noise information that is defined by associating positional information of the plurality of reading circuits or positional information of each of the plurality of pixels with feature data related to the blinking defect noise caused by the plurality of reading circuits; estimating a random noise amount in a pixel of interest based on the feature data and a random noise model for estimating the random noise amount in the pixel of interest; and correcting a pixel value of the pixel of interest based on the random noise amount.

The above and other features, advantages and technical and industrial significance of this invention will be better understood by reading the following detailed description of presently preferred embodiments of the invention, when considered in connection with the accompanying drawings.

DETAILED DESCRIPTION

Exemplary embodiments of the present invention will be described below with reference to the drawings. The present invention is not limited by the embodiments described below. The same reference signs are used to designate the same elements throughout the drawings.

First Embodiment

Configuration of Imaging System

Figure 1:
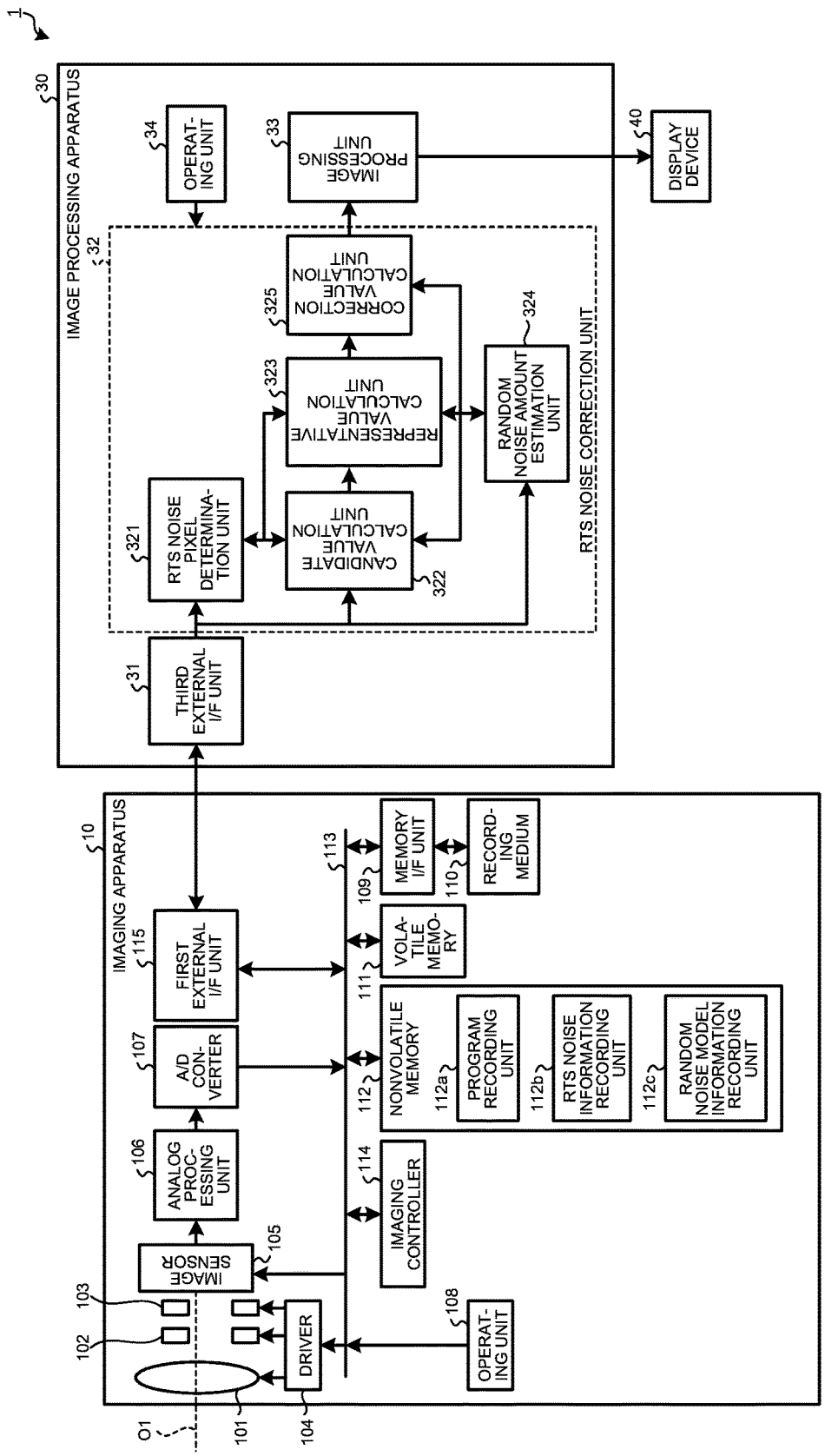
FIG. 1 is a block diagram schematically illustrating a configuration of an imaging system according to a first embodiment of the present invention.

FIG. 1 is a block diagram schematically illustrating a configuration of an imaging system according to a first embodiment of the present invention. An imaging system 1 illustrated in FIG. 1 includes an imaging apparatus 10, an image processing apparatus 30, and a display device 40.

Configuration of Imaging Apparatus

First, the configuration of the imaging apparatus 10 will be described. As illustrated in FIG. 1, the imaging apparatus 10 includes an optical system 101, a diaphragm 102, a shutter 103, a driver 104, an image sensor 105, an analog processing unit 106, an A/D converter 107, an operating unit 108, a memory I/F unit 109, a recording medium 110, a volatile memory 111, a nonvolatile memory 112, a bus 113, an imaging controller 114, and a first external I/F unit 115.

The optical system 101 includes one or more lenses. The optical system 101 includes, for example, a focus lens and a zoom lens.

The diaphragm 102 adjusts the exposure by limiting the incident amount of light collected by the optical system 101. Under the control of the imaging controller 114, the diaphragm 102 limits the incident amount of light collected by the optical system 101. The incident amount of light may be controlled using the shutter 103 and an electronic shutter in the image sensor 105 without using the diaphragm 102. The optical system 101 and the diaphragm 102 may be detachable from the imaging apparatus 10.

The shutter 103 sets the state of the image sensor 105 to an exposure state or a light shielding state. The shutter 103 includes, for example, a focal plane shutter. The electronic shutter in the image sensor 105 may be used without using the shutter 103.

The driver 104 drives the optical system 101, the diaphragm 102, and the shutter 103 under the control of the imaging controller 114 described later. For example, the driver 104 changes the zoom magnification of the imaging apparatus 10 or adjusts the focus position by moving the optical system 101 along an optical axis O1.

Under the control of an imaging controller 114 described later, the image sensor 105 receives the light collected by the optical system 101, converts the light into image data (electric signal), and outputs the image data. The image sensor 105 includes a complementary metal oxide semiconductor (CMOS) having a plurality of pixels arranged two-dimensionally. On a front face of each pixel, an RGB filter of Bayer arrangement is arranged. Note that the image sensor 105 is not limited to the Bayer arrangement, and may be a stacked type such as Fovion, for example. Further, the filter to be used is not limited to RGB, and any filter such as a complementary color filter can be applied. In addition, separately, a light source capable of applying different color light in a time division manner is arranged, and in the image sensor 105, a color image can be formed by using sequentially fetched images while changing the color to be applied without arranging a filter. Further, the image sensor 105 has an electronic shutter function capable of electronically controlling the amount of received light.

Figure 2:
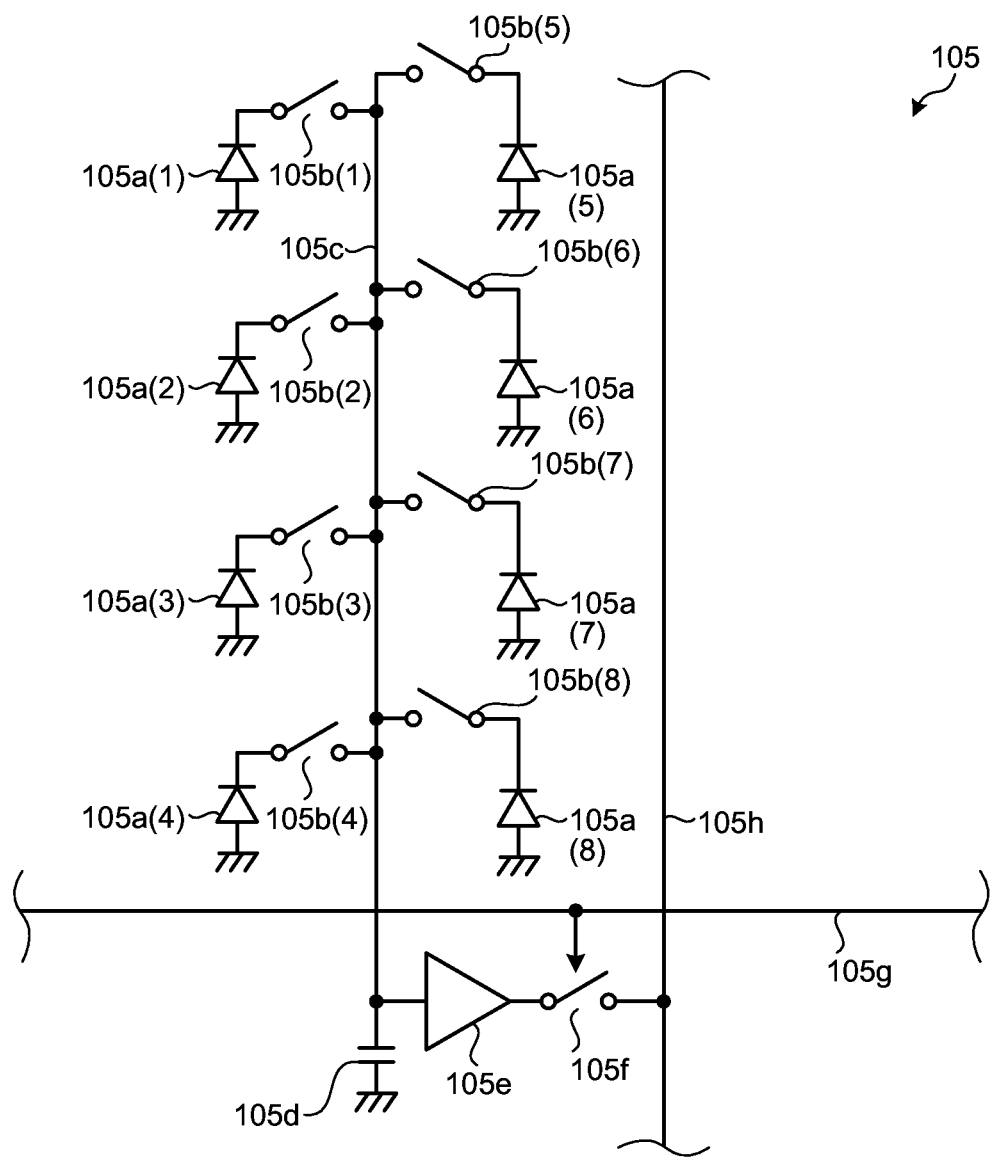
FIG. 2 is a schematic view illustrating a configuration of a main part of an image sensor according to a first embodiment of the present invention.

Here, the configuration of the image sensor 105 will be described in detail. FIG. 2 is a schematic view illustrating a configuration of a main part of the image sensor 105. In addition, the image sensor 105 illustrated in FIG. 2 illustrates an example in which a reading circuit is shared by a plurality of pixels in order to improve the sensitivity by improving the aperture ratio of the pixel. In the image sensor 105 illustrated in FIG. 2, one reading circuit is arranged for eight pixels of two pixels in a horizontal direction (lateral direction)×four pixels in a vertical direction (longitudinal direction). In FIG. 2, an example is described in which one reading circuit is set as one group for eight pixels of two pixels in the horizontal direction (lateral direction)×four pixels in the vertical direction (longitudinal direction); however, it is assumed that the pixel and the reading circuit described above are arranged on the image sensor 105 of the first embodiment side by side in the horizontal direction and the vertical direction.

As illustrated in FIG. 2, the image sensor 105 includes a plurality of pixels 105a (photodiodes) that receive light by exposure and generate photoelectric conversion, to generate a charge corresponding to the exposure amount, a first switch 105b that is provided in each of the plurality of pixels 105a and opens and closes according to a control of an imaging controller 114, a vertical transfer line 105c that vertically transfers a signal (charge) output from each of the plurality of pixels 105a, a floating diffusion (FD) unit 105d that accumulates the signal output from each of the plurality of pixels 105a, an amplification unit 105e that amplifies a signal output from the FD unit 105d, a second switch 105f that opens and closes according to the control of the imaging controller 114, a control line 105g that controls the second switch 105f, and a transfer line 105h that transfers an electric signal amplified by the amplification unit 105e.

In the case of reading a signal corresponding to an exposure amount in pixels 105a(1) to 105a(8) as a pixel value, first, the imaging controller 114 turns on only a first switch 105b(1) by setting the FD unit 105d in the reset state, so that the image sensor 105 thus configured transfers the electric charge generated in the pixel 105a(1) to the FD unit 105d. Thereafter, the imaging controller 114 turns on a second switch 105f so that the image sensor 105 uses the amplification unit 105e to amplify the charge accumulated in the FD unit 105d and reads (outputs) the amplified charge as a pixel value. Next, the image sensor 105 places the FD unit 105d in a reset state, and the imaging controller 114 turns on only the first switch 105b(2), so that a charge generated in the pixel 105a(2) is transferred to the FD unit 105d. Thereafter, the imaging controller 114 turns on a second switch 105f so that the image sensor 105 uses the amplification unit 105e to amplify the charge accumulated in the FD unit 105d and reads the amplified charge as a pixel value. By sequentially executing such a reading operation, the image sensor 105 can sequentially output a signal corresponding to the exposure amount in the pixels 105a(1) to 105a(8) as a pixel value. In the first embodiment, the amplification unit 105e functions as the reading circuit that reads a charge from each of the plurality of pixels 105a.

Returning to FIG. 1, the explanation of the configuration of the imaging apparatus 10 will be continued.

The analog processing unit 106 executes predetermined analog processing on an analog signal input from the image sensor 105 and outputs the resultant signal to the A/D converter 107. Specifically, the analog processing unit 106 executes noise reduction processing, gain up processing, and the like on the analog signal input from the image sensor 105. For example, the analog processing unit 106 executes waveform shaping after reducing the reset noise and the like with respect to the analog signal, and further increases the gain so as to achieve a target brightness.

The A/D converter 107 generates digital image data (hereinafter referred to as "RAW image data") by executing A/D conversion on the analog signal input from the analog processing unit 106, and supplies the digital image data to the volatile memory 111 via the bus 113. Note that the A/D converter 107 may directly output the RAW image data to each unit of the imaging apparatus 10 described later. Note that the analog processing unit 106 and the A/D converter 107 may be provided in the image sensor 105, and the image sensor 105 may directly output digital RAW image data.

The operating unit 108 gives various instructions of the imaging apparatus 10. Specifically, the operating unit 108 includes a power switch that switches a power supply state of the imaging apparatus 10 to an on state or an off state, a release switch that gives an instruction for capturing a still image, an operation switch that switches various settings of the imaging apparatus 10, and a moving image switch that gives an instruction for capturing a moving image.

The recording medium 110 includes a memory card configured to be inserted into and removed from the imaging apparatus 10 via the memory I/F unit 109. Under the control of the imaging controller 114, programs and various kinds of information may be output from the recording medium 110 to the nonvolatile memory 112 via the memory I/F unit 109.

The volatile memory 111 temporarily stores the image data input from the A/D converter 107 via the bus 113. For example, the volatile memory 111 temporarily stores image data sequentially output by the image sensor 105 frame by frame via the analog processing unit 106, the A/D converter 107, and the bus 113. The volatile memory 111 includes a synchronous dynamic random access memory (SDRAM).

The nonvolatile memory 112 includes a flash memory to record various programs for operating the imaging apparatus 10, and various data used during execution of the programs. The nonvolatile memory 112 includes a program recording unit 112a, an RTS noise information recording unit 112b for recording RTS noise positional information defined by associating positional information of the reading circuit (amplification unit 105e) that reads the pixel value or positional information of each of the plurality of pixels 105a with feature data relating to RTS noise caused by the reading circuit (amplification unit 105e), and a random noise model information recording unit 112c that records one or a plurality of random noise models. Here, the feature data is either the amplitude of the RTS noise (RTS_Value), the occurrence frequency of blinking defect noise, or the occurrence frequency in the RTS noise less than the amplitude of the RTS noise.

The bus 113 is configured by using a transmission path or the like connecting the respective constituent parts of the imaging apparatus 10 and transfers various data generated inside the imaging apparatus 10 to each component part of the imaging apparatus 10.

The imaging controller 114 includes a central processing unit (CPU), and issues instructions and transfer data to each unit constituting the imaging apparatus 10 in accordance with command signals and a release signal from the operating unit 108 to perform overall control of the operation of the imaging apparatus 10. For example, when a second release signal is input from the operating unit 108, the imaging controller 114 starts controlling an image capturing operation in the imaging apparatus 10. Here, the image capturing operation in the imaging apparatus 10 is an operation executed by the analog processing unit 106 and the A/D converter 107 with respect to the exposure timing of the image sensor 105, the output timing of the analog signal, and the analog signal output from the image sensor 105. The image data thus processed is recorded on the recording medium 110 via the bus 113 and the memory I/F unit 109 under the control of the imaging controller 114.

The first external I/F unit 115 outputs information input from an external device via the bus 113 to the nonvolatile memory 112 or the volatile memory 111, while outputting to the external device via the bus 113, information to be recorded by the volatile memory 111, information stored in the nonvolatile memory 112, and image data generated by the image sensor 105. Specifically, the first external I/F unit 115 outputs image data, RTS noise information, and random noise model information generated by the image sensor 105 to the image processing apparatus 30 via the bus 113.

Configuration of Image Processing Apparatus

Next, the configuration of the image processing apparatus 30 will be described. The image processing apparatus 30 includes a third external I/F unit 31, an RTS noise correction unit 32, an image processing unit 33, and an operating unit 34.

The third external I/F unit 31 operates as an information acquisition unit that acquires image data generated by the image sensor 105 via the first external I/F unit 115 of the imaging apparatus 10, RTS noise information on the RTS noise recorded by the RTS noise information recording unit 112b in the nonvolatile memory 112, and random noise model information recorded by the random noise model information recording unit 112c, and outputs the acquired image data, the RTS noise information, and the random noise model information to the RTS noise correction unit 32. The third external I/F unit 31 and the first external I/F unit 115 are connected via, for example, a control cable capable of bidirectionally exchanging information, wireless communication, or the like. In the present embodiment, the third external I/F unit 31 functions as the information acquisition unit.

The RTS noise correction unit 32 executes RTS noise correction processing for correcting RTS noise on the RAW image recorded in the RTS noise information recording unit 112b of the nonvolatile memory 112 of the imaging apparatus 10, and outputs the corrected RAW image to the image processing unit 33. The RTS noise correction unit 32 includes an RTS noise pixel determination unit 321, a candidate value calculation unit 322, a representative value calculation unit 323, a random noise amount estimation unit 324, and a correction value calculation unit 325.

The RTS noise pixel determination unit 321 acquires RTS noise information recorded in the RTS noise information recording unit 112b of the imaging apparatus 10 via the third external I/F unit 31, the first external I/F unit 115, and the bus 113, determines whether there is a possibility of occurrence of RTS noise in the pixel on the acquired RAW image, and outputs the determination result to the candidate value calculation unit 322 and the representative value calculation unit 323. Specifically, when the position of the pixel is input to the RTS noise pixel determination unit 321, the RTS noise pixel determination unit 321 determines whether or not the RTS noise information on the pixel is recorded in the RTS noise information recording unit 112b of the imaging apparatus 10. When the RTS noise information is recorded, the RTS noise pixel determination unit 321 outputs the RTS noise information (information indicating presence of RTS noise), and when the RTS noise information is not recorded in the RTS noise information recording unit 112b of the imaging apparatus 10, the pixel is regarded as a pixel where RTS noise does not occur and the RTS noise pixel determination unit 321 does not output the RTS noise information.

When the RTS noise pixel determination unit 321 determines that RTS noise may occur in the pixel of interest, based on the pixel value of the pixel of interest and the determination result of the RTS noise pixel determination unit 321, the candidate value calculation unit 322 calculates a plurality of candidate values of the correction amount with respect to the pixel value of the pixel of interest and outputs the pixel value of the pixel of interest and the plurality of calculated candidate values to the representative value calculation unit 323, the random noise amount estimation unit 324, and the correction value calculation unit 325, respectively.

When the RTS noise pixel determination unit 321 determines that RTS noise may occur in the pixel of interest, the representative value calculation unit 323 calculates a representative value corresponding to a pixel value in which RTS noise does not occur, based on pixels surrounding the pixel of interest in which the RTS noise pixel determination unit 321 determines that RTS noise does not occur, and based on a reference value of the random noise amount corresponding to the pixel of interest calculated by the random noise amount estimation unit 324. The representative value calculation unit 323 outputs the pixel value of the pixel of interest, the plurality of candidate values, and the representative value calculated above to the correction value calculation unit 325. In the first embodiment, the representative value calculation unit 323 functions as an estimation unit.

Figure 3:
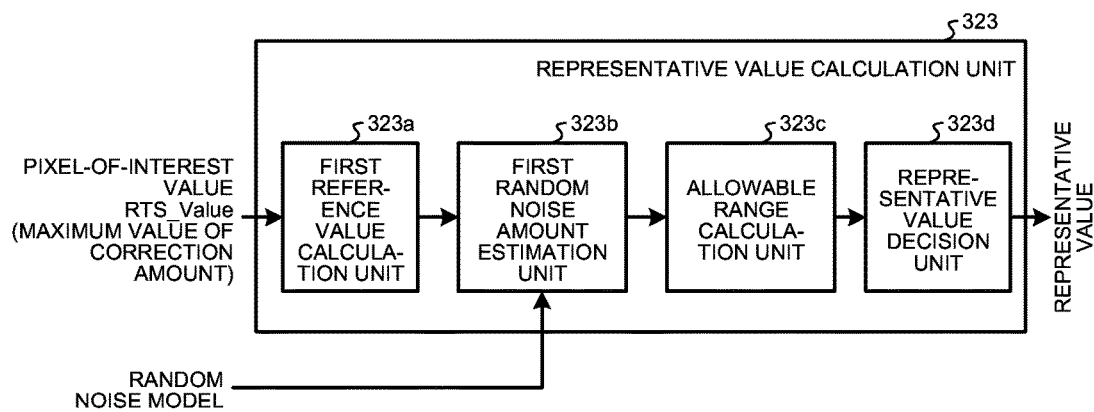
FIG. 3 is a block diagram illustrating a detailed configuration of a representative value calculation unit according to the first embodiment of the present invention.

Here, the detailed configuration of the representative value calculation unit 323 will be described. FIG. 3 is a block diagram illustrating a detailed configuration of the representative value calculation unit 323. As illustrated in FIG. 3, the representative value calculation unit 323 includes a first reference value calculation unit 323a, a first random noise amount estimation unit 323b, an allowable range calculation unit 323c, and a representative value decision unit 323d.

The first reference value calculation unit 323a calculates a reference value used for estimating the random noise amount. Specifically, the first reference value calculation unit 323a calculates a reference value by adding RTS_Value to the pixel value of the pixel of interest or by adding the maximum value of the correction amount candidate values to the pixel value of the pixel of interest.

The first random noise amount estimation unit 323b acquires the random noise model recorded in the random noise model information recording unit 112c via the third external I/F unit 31, the first external I/F unit 115, and the bus 113, and calculates the random noise amount based on the acquired random noise model and the reference value calculated by the first reference value calculation unit 323a.

Based on the pixel value of the pixel within the calculation range set on the basis of the pixel of interest and the random noise amount calculated by the first random noise amount estimation unit 323b, the allowable range calculation unit 323c calculates an allowable range (effective range) which is a range of the pixel value usable for the representative value calculation processing.

The representative value decision unit 323d determines a pixel value (within the effective range) included in pixel values other than the pixel of interest in the calculation range within the allowable range (within the effective range) (in the case of the image sensor 105 using the color filter, the pixel value of the same color as a pixel of interest), and when the selected number of pixels is equal to or larger than the predetermined value, the representative value decision unit 323d decides the median value of the selected pixel value as the representative value.

Returning to FIG. 1, the explanation of the image processing apparatus 30 will be continued.

Based on the random noise model recorded by the random noise model information recording unit 112c of the imaging apparatus 10, the random noise amount estimation unit 324 estimates the random noise amount corresponding to the pixel value and outputs the estimation result to the candidate value calculation unit 322, the representative value calculation unit 323, and the correction value calculation unit 325, respectively. That is, when a pixel value is input to the random noise amount estimation unit 324, the random noise amount corresponding to the pixel value is output.

When the RTS noise pixel determination unit 321 determines that RTS noise may occur in the pixel of interest, the correction value calculation unit 325 corrects the pixel value of the pixel of interest based on the plurality of candidate values calculated by the candidate value calculation unit 322. Specifically, based on the pixel value of the pixel of interest, the plurality of candidate values calculated by the candidate value calculation unit 322, and the representative value calculated by the representative value calculation unit 323, the correction value calculation unit 325 calculates the pixel value having the corrected RTS noise, and outputs the calculated pixel value to the image processing unit 33. More specifically, based on the candidate value such that the correction result is the closest to the representative value calculated by the representative value calculation unit 323, the correction value calculation unit 325 corrects the pixel value of the pixel of interest from the plurality of candidate values calculated by the candidate value calculation unit 322. On the other hand, when the RTS noise pixel determination unit 321 determines that the RTS noise does not occur in the pixel of interest, the correction value calculation unit 325 outputs the pixel value of the pixel of interest as it is. In the first embodiment, the correction value calculation unit 325 functions as a correction unit.

Figure 4:
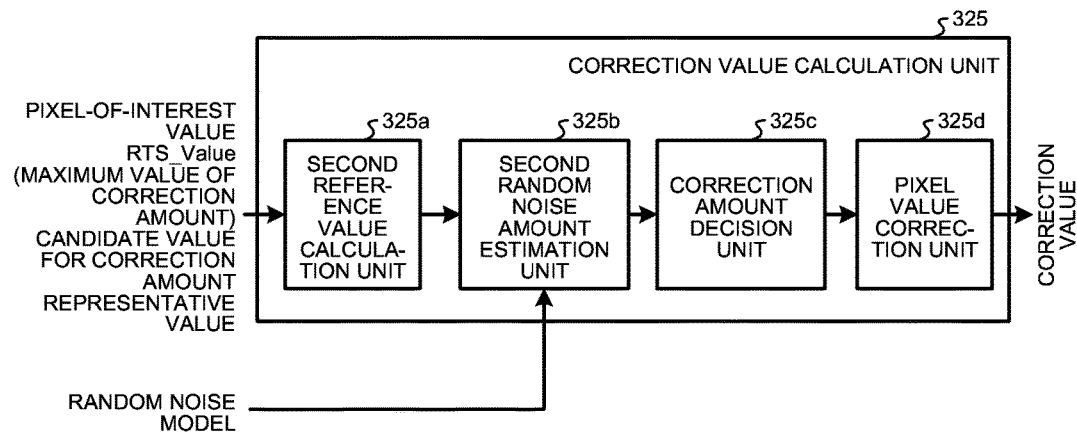
FIG. 4 is a block diagram illustrating a detailed configuration of a correction value calculation unit according to the first embodiment of the present invention.

Here, the detailed configuration of the correction value calculation unit 325 will be described. FIG. 4 is a block diagram illustrating the detailed configuration of the correction value calculation unit 325. As illustrated in FIG. 4, the correction value calculation unit 325 includes a second reference value calculation unit 325a, a second random noise amount estimation unit 325b, a correction amount decision unit 325c, and a pixel value correction unit 325d.

The second reference value calculation unit 325a calculates a value obtained by subtracting RTS_Value from the pixel value of the pixel of interest or a value obtained by subtracting the maximum value among the correction amount candidate values from the pixel value of the pixel of interest, as a reference value.

The second random noise amount estimation unit 325b acquires the random noise model recorded in the random noise model information recording unit 112c via the third external I/F unit 31, the first external I/F unit 115, and the bus 113, and calculates the random noise amount based on the acquired random noise model and the reference value calculated by the second reference value calculation unit 325a.

The correction amount decision unit 325c calculates a value obtained by multiplying the random noise amount calculated by the second random noise amount estimation unit 325b by a certain coefficient as a threshold value. After determining whether or not the maximum candidate value among the correction amount candidate values calculated by the candidate value calculation unit 322 is equal to or larger than the threshold value, the correction amount decision unit 325c selects the representative value calculated by the representative value calculation unit 323 and the candidate value for the correction amount closest to the absolute value of the pixel of interest, as the correction amount.

The pixel value correction unit 325d calculates the pixel value of the corrected pixel of interest by adding or subtracting the pixel value of the pixel of interest by the correction amount so as to approach the representative value.

Returning to FIG. 1, the explanation of the image processing apparatus 30 will be continued.

The image processing unit 33 executes predetermined image processing on the image data having RTS noise that has been corrected by the RTS noise correction unit 32, and outputs the image data to the display device 40. Here, the predetermined image processing executes basis processing including at least optical black subtraction processing, white balance adjustment processing, processing for synchronizing image data when the image sensor is in the Bayer arrangement, color matrix calculation processing, $\gamma$ correction processing, color reproduction processing and edge emphasis processing, and noise reduction processing and the like. Further, the image processing unit 33 executes image processing for reproducing a natural image based on the preset parameter of each preset image processing. Here, the parameters of each image processing are the values of contrast, sharpness, chroma, white balance and gradation.

The operating unit 34 receives various operation signals for the image processing apparatus 30. The operating unit 34 has four directional buttons, a push button, and a touch panel, for example.

Configuration of Display Device

Next, the configuration of the display device 40 will be described. The display device 40 displays an image corresponding to the image data input from the image processing apparatus 30. The display device 40 includes a display panel made of liquid crystal or organic electro luminescence (EL).

In the imaging system 1 having the above configuration, the image processing apparatus 30 corrects the RTS noise occurred in the image sensor 105, and the display device 40 displays an image corresponding to the image data subjected to image processing by the image processing apparatus 30.

Cause for RTS Noise and Characteristics of RTS Noise

Next, the cause for RTS noise and the characteristics of RTS noise will be described.

Figure 5:
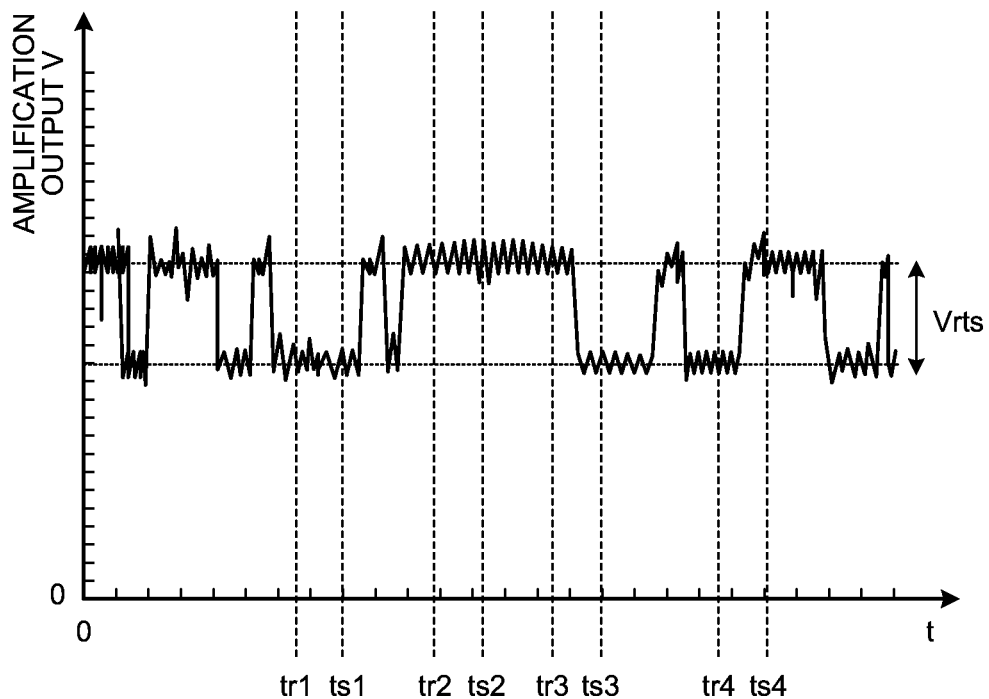
FIG. 5 is a graph illustrating an example of fluctuation in the amplification output from an amplification unit when RTS noise occurs in a case where light is blocked so that light does not hit the image sensor according to the first embodiment of the present invention.
Figure 6:
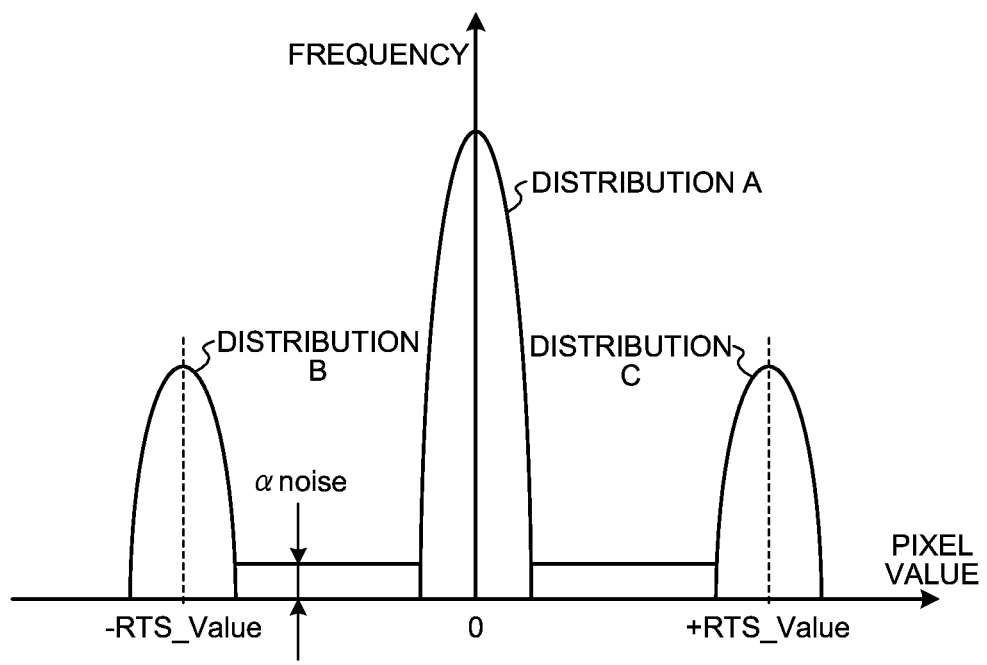
FIG. 6 is a diagram illustrating an example of a distribution of a pixel value read using an amplification unit where RTS noise occurs according to the first embodiment of the present invention.

FIG. 5 is a graph illustrating an example of fluctuation in the amplification output from the amplification unit 105e when RTS noise occurs in a case where light is blocked so that light does not hit the image sensor 105. FIG. 6 is a diagram illustrating an example of a distribution of a pixel value read using the amplification unit 105e where RTS noise occurs.

The RTS noise occurs when a trap level is present in the gate oxide film in the amplification unit 105e and in this case, a charge is captured or discharged at the trap level at random timing. Therefore, as illustrated in FIG. 5, in the amplification unit 105e where RTS noise occurs, the amplification output fluctuates at random within the range of about Vrts. In addition, the fluctuation of potential does not occur instantaneously, and it takes a short period of time $\tau$.

In general, in the image sensor 105, correlated double sampling processing (hereinafter referred to as "CDS processing") is executed in order to reduce noise from the pixel value read from the pixel 105a. In the CDS processing, the imaging controller 114 turns on the reset switch (not illustrated) of the image sensor 105 to reset the charge of the FD unit 105d, and moreover, the imaging controller 114 turns on the second switch 105f to create a reset state and read (output) a reset state signal (reference signal). Next, in the CDS processing, the imaging controller 114 turns on only the first switch 105b (or any one of the first switches 105b(1) to 105b(8)), transfers the charge generated at the pixel 105a to the FD unit 105d, and moreover, the imaging controller 114 creates a read state (output state) in which the second switch 105f is turned on to read (output) a signal in a read state. Subsequently, in the CDS processing, a signal obtained by subtracting the reset state signal (reference signal) from the read state signal is converted as a pixel value.

As illustrated in FIG. 5, when the image sensor 105 reads signals of time tr1 (reset state) and time ts1 (read state) by the CDS processing, since the amplification outputs V of the time tr1 and the time ts1 are substantially the same, the read pixel value is mainly influenced by a random noise to become a distribution centered on 0 like the distribution A illustrated in FIG. 6. Similarly, even at time tr2 (reset state) and time ts2 (read state), the image sensor 105 has substantially the same amplification output V at the time tr2 and the time ts2, the read pixel value becomes the distribution A illustrated in FIG. 6.

On the other hand, when the image sensor 105 reads the signals of time tr3 (reset state) and time ts3 (read state) by the CDS processing, the amplification output at the time ts3 is about Vrts lower than the amplification output at the time tr3. Therefore, when taking the difference between the two signals, the image sensor 105 shifts in the minus direction by RTS_Value which is the pixel value corresponding to Vrts which is the change amount of the amplification output, and the read pixel value becomes the distribution B centered on −RTS_Value.

On the other hand, when the image sensor 105 reads the signals of time tr4 (reset state) and time ts4 (read state) by the CDS processing, the amplification output at the time ts4 is about Vrts higher than the amplification output at the time tr4. Therefore, when taking the difference between the two signals, the image sensor 105 shifts in the plus direction by RTS_Value which is the pixel value corresponding to Vrts which is the change amount of the amplifier output, and the read pixel value becomes the distribution C centered on RTS_Value.

Here, fluctuation of the amplification output in FIG. 5 occurs with the time τ, so that the signal may be read while the potential fluctuates. In this case, the amplification output difference is larger than −Vrts and smaller than Vrts between the read time in the reset state and the read time in the read state. As a result, the pixel value read from the image sensor 105 is also larger than −RTS_Value and smaller than RTS_Value. Since it is considered that the time τ becomes substantially constant when the conditions (for example, temperature, driving voltage, and the like) of the image sensor 105 are constant, a pixel value larger than RTS_Value and smaller than RTS_Value occurs with similar probability. Here, the occurrence frequency of these pixel values is defined as αnoise. In addition, each of the distribution B and the distribution C are similar to each other except for a median value. Therefore, hereinafter, the ratio of distribution B or distribution C to distribution A is defined as αrts. This αrts increases as the variation period of the amplification output of the amplification unit 105e is shorter.

The distribution of the pixel values read by using the amplification unit 105e where the RTS noise occurs using the CDS processing is shown in FIG. 6. Under the condition that the image sensor 105 is exposed to light, the potential in the read state changes according to the exposure amount. However, the potential change due to the RTS noise is constant regardless of the exposure amount. That is, the RTS noise does not depend on the exposure amount, and has a characteristic of randomly fluctuating with respect to a normal pixel value in a range from −RTS_Value or more and RTS_Value or less. In FIG. 6, the distribution A, the distribution B, and the distribution C are schematically illustrated, but in general, they are illustrated as a normal distribution.

In addition, since the RTS noise is noise caused by the reading circuit (amplification unit 105e), as illustrated in FIG. 2, when each of the plurality of pixels 105a shares one reading circuit, all the shared pixels (pixels 105a(1) to 105a(8)), RTS noise having similar characteristics occurs.

In addition to the reading circuit (amplification unit 105e) illustrated in FIG. 2, RTS noise may also occur in a column amplifier, a source follower, and the like which are shared in the column direction of the image sensor 105. In this case, RTS noise having similar characteristics also occurs in all the pixels in the column direction in which the same column amplifier and source follower are shared. In the present embodiment, the present invention can also be applied to RTS noise occurred by a circuit other than the reading circuit (amplification unit 105e).

As described above, when the subject is fixed and captured under the same conditions, the RTS noise becomes a type of blinking defect noise that causes the pixel value of the image obtained by executing capturing to oscillate (fluctuate) within a certain range (−RTS_Value or more, and RTS_Value or less).

Processing of Image Processing Apparatus

Figure 7:
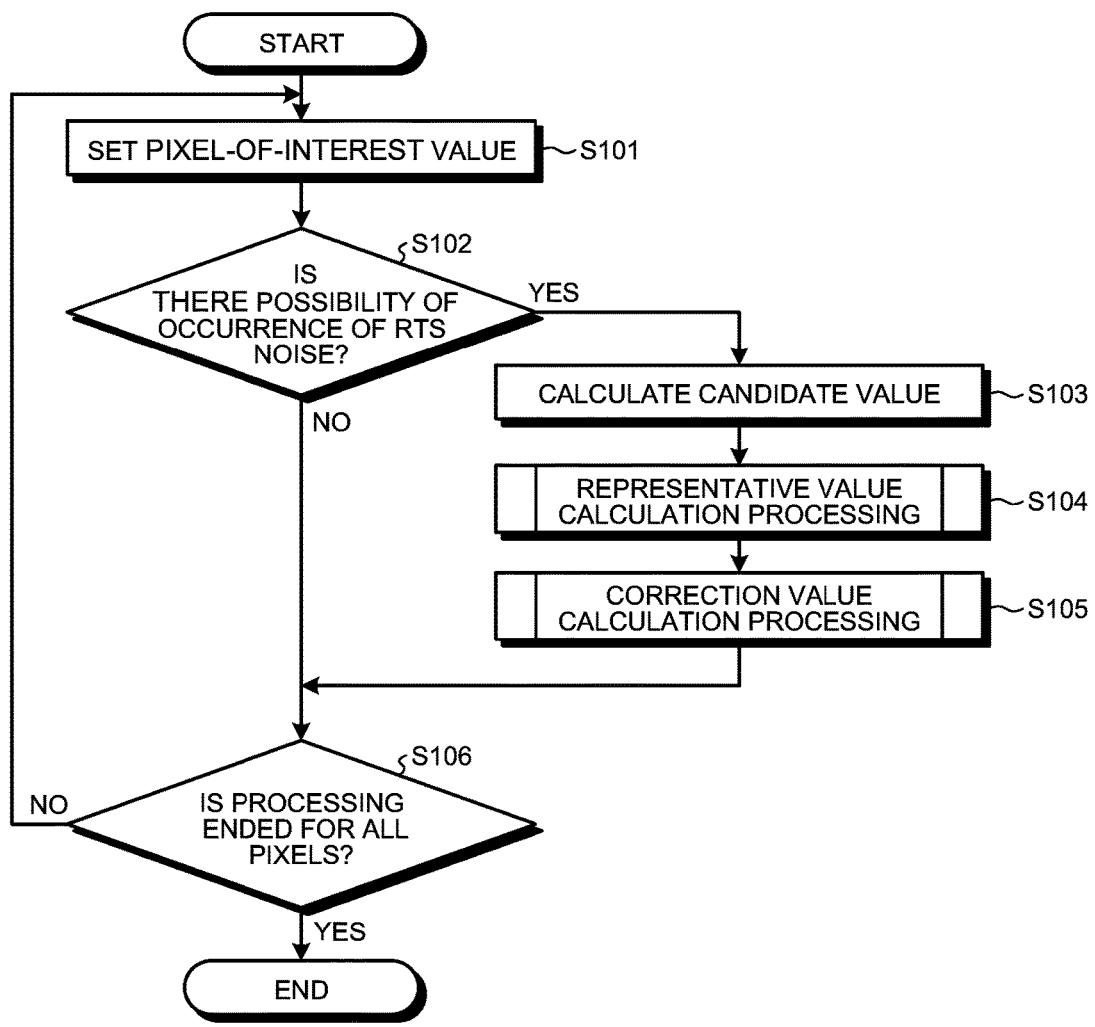
FIG. 7 is a flowchart illustrating an outline of processing executed by the image processing apparatus according to the first embodiment of the present invention.

Next, processing executed by the image processing apparatus 30 will be described. FIG. 7 is a flowchart illustrating the outline of processing executed by the image processing apparatus 30, and is a flowchart of a main routine executed by the image processing apparatus 30.

First, the RTS noise correction unit 32 sets a pixel of interest for sequentially executing processing of steps S102 to S105 described later (step S101). Note that the RTS noise correction unit 32 assigns integers larger than 0 in a raster order from an upper left to a lower right for each pixel, as indexes 1, 2, and 3 in order. Next, each time step S101 is executed, the RTS noise correction unit 32 increases the counter by 1 (the counter is reset to 0 at the time when the processing in FIG. 7 is started). The RTS noise correction unit 32 sets the pixel to which the index indicated by the counter is assigned as a pixel of interest. That is, when the step S101 is executed by the RTS noise correction unit 32 for the first time, the RTS noise correction unit 32 increments the counter reset to 0 by 1, so that the counter indicates 1 and the pixel on the upper left becomes a pixel of interest. When the RTS noise correction unit 32 executes the processing in step S101 twice (the second time), since the counter indicates 2, the pixel on the right side of the upper left pixel becomes a pixel of interest.

Subsequently, the RTS noise pixel determination unit 321 acquires the RTS noise information recorded by the RTS noise information recording unit 112b of the nonvolatile memory 112 of the imaging apparatus 10 via the third external I/F unit 31, the first external I/F unit 115, and the bus 113, and based on the acquired RTS noise information, the RTS noise pixel determination unit 321 determines whether or not there is a possibility of occurrence of RTS noise in the pixel of interest (step S102). That is, the RTS noise pixel determination unit 321 determines whether or not the positional information of the shared pixel block including the pixel of interest is included in the RTS noise information. Specifically, the RTS noise pixel determination unit 321 determines whether or not the positional information of the shared pixel block including the pixel of interest is included in the RTS noise information as a shared pixel block where RTS noise may occur. When the RTS noise pixel determination unit 321 determines that RTS noise is likely to occur in the pixel of interest (determination is made that the positional information of the shared pixel block including the pixel of interest is included in the RTS noise information) (step S102: Yes), the image processing apparatus 30 proceeds to step S103 described later. On the other hand, when the RTS noise pixel determination unit 321 determines that RTS noise is not likely to occur in the pixel of interest (determination is made that the positional information of the shared pixel block including the pixel of interest is not included in the RTS noise information) (step S102: No), the image processing apparatus 30 proceeds to step S106 described later. In this case, when the RTS noise pixel determination unit 321 determines that RTS noise may occur in the pixel of interest, the RTS noise pixel determination unit 321 outputs the pixel value of the pixel of interest as it is to the representative value calculation unit 323 as the corrected pixel value.

In step S103, the candidate value calculation unit 322 calculates a plurality of candidate values of correction amounts for correcting RTS noise. Specifically, based on the RTS_Value (included in the RTS noise information output from the RTS noise pixel determination unit 321) corresponding to the pixel of interest, the candidate value calculation unit 322 sets all values that can be taken as pixel values of 0 or more to RTS_Value or less (all integers of 0 or more to RTS_Value or less when only an integer can be taken as RAW images) are taken as a candidate value. Note that when the amplifier gain value set in the column amplifier or the like of the image sensor 105 by the imaging controller 114 is different between RTS noise detection (the amplifier gain value=G0) and RTS noise correction time (the amplifier gain value=G1), the candidate value calculation unit 322 may replace RTS_Value with a value obtained by multiplying RTS_Value by the ratio (G=G1/G0) between the amplifier gain value at the time of RTS noise correction and the amplifier gain value at the time of RTS noise detection. Furthermore, the candidate value calculation unit 322 may cause the RTS noise information to have RTS_Value for each preset amp gain value and use the RTS_Value corresponding to this set amplifier gain value.

Based on pixel values of surrounding pixels of the pixel of interest, the representative value calculation unit 323 executes representative value calculation processing of calculating a representative value (a pixel value predicted in a case where the RTS noise does not occur in the pixel of interest) (step S104). The representative value calculation unit 323 may include pixels where RTS noise occurs.

Figure 8:
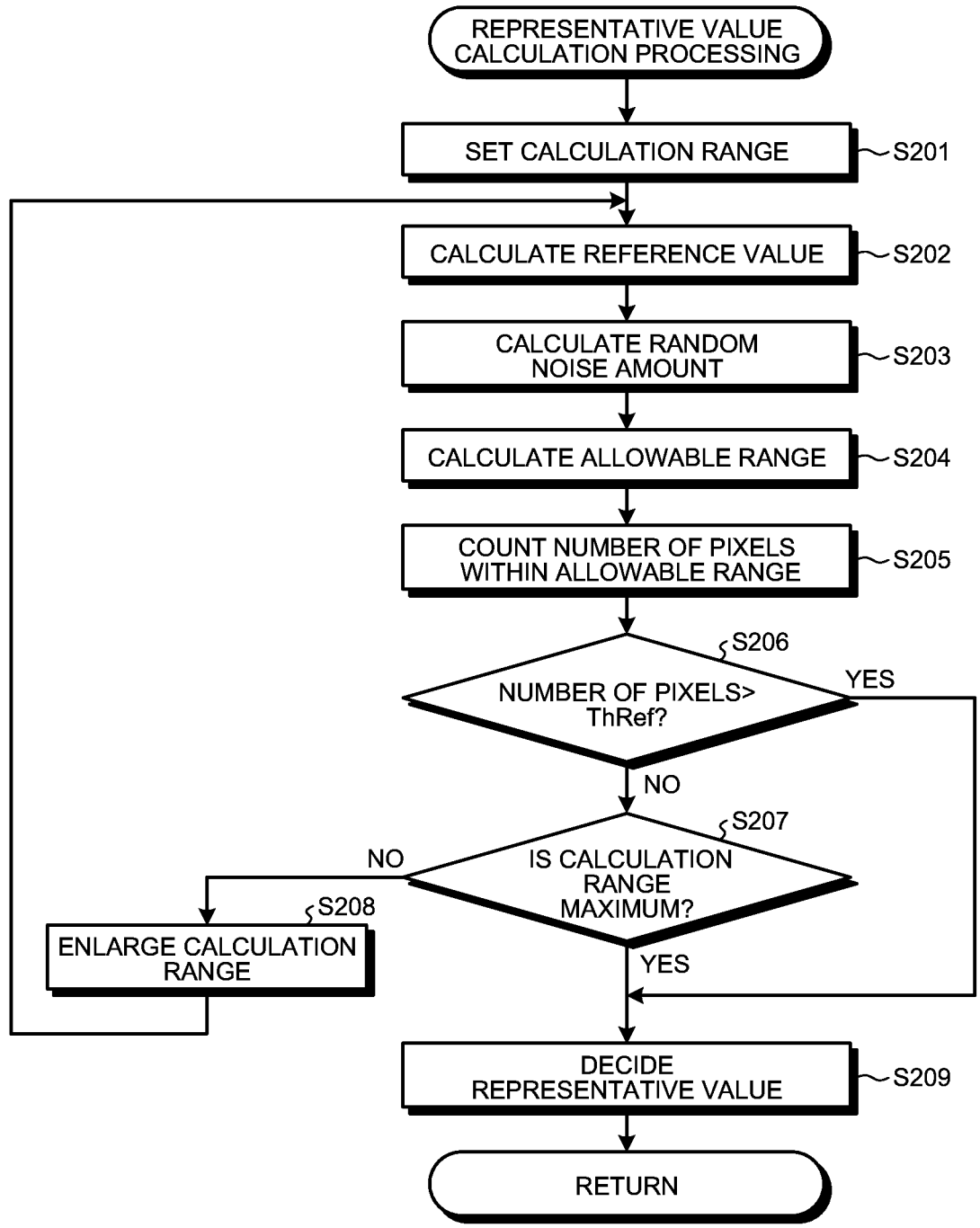
FIG. 8 is a flowchart illustrating an outline of representative value calculation processing of FIG. 7.

FIG. 8 is a flowchart illustrating an outline of representative value calculation processing in step S104 of FIG. 7.

As illustrated in FIG. 8, first, the representative value calculation unit 323 sets a minimum calculation range to be subjected to the representative value calculation on the basis of the pixel of interest (step S201).

Specifically, in a case where a range of the maximum of 7×7 in the range of the target is set as the calculation range with the pixel of interest as the center, for example, the representative value calculation unit 323 sets 3×3, which is the minimum range of 7×7 or less, as the minimum calculation range.

Subsequently, the first reference value calculation unit 323a calculates a value obtained by adding RTS_Value to the pixel value of the pixel of interest or a value obtained by adding the maximum value of the correction amount to the pixel value of the pixel of interest, as a reference value (step S202).

Thereafter, the first random noise amount estimation unit 323b acquires the random noise model recorded in the random noise model information recording unit 112c via the third external I/F unit 31, the first external I/F unit 115, and the bus 113, and calculates the random noise amount based on the acquired random noise model and the reference value calculated by the first reference value calculation unit 323a in step S202 (step S203).

Figure 9:
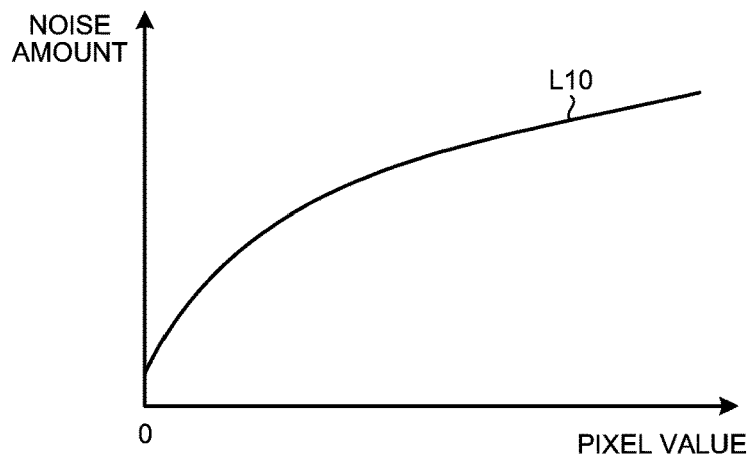
FIG. 9 is a diagram illustrating an example of a random noise model according to the first embodiment of the present invention.

FIG. 9 is a diagram illustrating an example of a random noise model. In FIG. 9, a vertical axis represents a noise amount and a horizontal axis represents a pixel value. In FIG. 9, the standard deviation of the pixel value is used as the random noise amount on the vertical axis, and a random noise model corresponding to the characteristics of the image sensor 105 is illustrated.

As indicated by a curve L10 in FIG. 9, the random noise amount in the image sensor 105 increases as the pixel value increases. Therefore, based on the random noise model of the curve L10 in FIG. 9 and the reference value calculated by the first reference value calculation unit 323a, the first random noise amount estimation unit 323b in the first embodiment calculates the random noise amount (calculates the standard deviation). Besides the curve illustrated in FIG. 9, the random noise model may be approximated by an approximation formula or a polygonal line.

After step S203, based on the pixel value of the pixel within the calculation range, the allowable range calculation unit 323c calculates an allowable range (effective range) which is a range of the pixel value usable for the representative value calculation processing (step S204). Specifically, the allowable range calculation unit 323c calculates the upper limit of the allowable range (effective range) by the following expression (1).

$$\text{Reference value+Random noise amount (standard deviation)}\times R+\text{RTS\_Value} \quad (1)$$

Here, R is a predetermined coefficient and is set according to how visually the RTS noise can be grasped against random noise. For example, the coefficient of R is preferably around 2. Also, the representative value calculation unit 323 calculates the lower limit of the allowable range by the following expression (2).

$$\text{Reference value-Random noise amount (standard deviation)}\times R-\text{RTS\_Value} \quad (2)$$

Instead of RTS_Value, the maximum value of a plurality of candidate values may be used. Further, the reference values in the expressions (1) and (2) may be a reference value obtained by a reference value method different from the reference value used for estimating the random noise amount by the first random noise amount estimation unit 323b in step S203 described above. In this manner, the allowable range calculation unit 323c can calculate the allowable range in consideration of the RTS noise of the pixel of interest and the random noise around the pixel of interest.

After that, for each pixel value of pixels other than the pixel of interest within the calculation range (pixel value having the same color as the pixel of interest in the case of the image sensor 105 using the color filter), the allowable range calculation unit 323c determines whether or not the pixel value is within the allowable range calculated in step S204 described above, and counts the number of pixel values within the allowable range (step S205). The count value obtained in this step S205 tends to be larger as in the case of a flat subject and smaller as in the case of a subject including the edge. Pixels which may have RTS noise within the calculation range may not be counted.

Subsequently, when the count value (the number of pixels) counted in step S205 described above is larger than a predetermined value ThRef (step S206: Yes), the image processing apparatus 30 proceeds to step S209 described later. Here, the predetermined value ThRef is preferably set to 1 or more in order for the representative value calculation unit 323 to calculate the representative value from surrounding pixels of the pixel of interest. On the other hand, when the count value counted in step S205 is not larger than the predetermined value ThRef (step S206: No), the image processing apparatus 30 proceeds to step S207 described later.

In step S207, when the calculation range to be subjected to the representative value calculation is the maximum (step S207: Yes), the image processing apparatus 30 proceeds to step S209 described later. On the other hand, when the calculation range to be subjected to the representative value calculation is not the maximum (step S207: No), the image processing apparatus 30 proceeds to step S208 described later.

In step S208, the allowable range calculation unit 323c enlarges the calculation range for calculating the representative value (step S208). Specifically, the allowable range calculation unit 323c enlarges the calculation range to be subjected to the representative value calculation by one or more pixels in the horizontal or vertical direction within a range that falls within the maximum range. For example, when the 3×3 range centered on the pixel of interest is set as a calculation range, the allowable range calculation unit 323c resets the 5×5 range centered on the pixel of interest to the calculation range. After step S208, the image processing apparatus 30 returns to step S202. In step S208, the allowable range calculation unit 323c sets the range of 3×3 or 5×5 as the calculation range, but it may be enlarged only horizontally or vertically, for example, to set a range of 5×3 or 3×5 as the calculation range.

In step S209, the representative value decision unit 323d decides a representative value (step S209). Specifically, first, the representative value decision unit 323d selects a pixel value (within the effective range) included in pixel value of the pixel other than the pixel of interest in the calculation range within the allowable range (within the effective range) (in the case of the image sensor 105 using the color filter, the pixel value having the same color as the pixel of interest). Thereafter, when the selected number of pixels is equal to or larger than the predetermined value ThRef, the representative value decision unit 323d decides a median value of the selected pixel value as a representative value. When the number of selected pixel values is an even number, the representative value decision unit 323d calculates a median value close to the pixel value of the pixel of interest as a representative value. In this case, overcorrection can be prevented. When the selected number of pixels is less than the predetermined value ThRef, the representative value decision unit 323d sets the pixel value of the pixel other than the pixel of interest within the calculation range having the pixel value closest to the pixel value of the pixel of interest as the representative value. Although the representative value decision unit 323d calculates the representative value using the median value, the representative value decision unit 323d may calculate the representative value by another method such as an average value or an intermediate value of the distribution, for example. Also, the representative value decision unit 323d may execute edge direction discrimination within the calculation range, and may calculate peripheral pixel values in the direction with the highest correlation as the representative value based on the result of this edge direction discrimination. Furthermore, the representative value decision unit 323d may exclude a pixel that may have RTS noise in pixels within the calculation range other than the pixel of interest. At this time, when there are no pixels with no possibility of occurrence of RTS noise within the calculation range at the time when step S209 is executed, the representative value decision unit 323d sets the pixel value in the RAW image of the pixel of interest as a representative value. After step S209, the image processing apparatus 30 returns to the main routine of FIG. 7 described above.

In this manner, in the representative value calculation processing described above, the representative value calculation unit 323 calculates a representative value by prioritizing the vicinity of the pixel of interest. Furthermore, the representative value calculation unit 323 limits the range of pixel values of surrounding pixels of the pixel of interest based on the random noise amount estimated by the first random noise amount estimation unit 323b so that the representative value does not fluctuate due to an edge or the like, and then calculates a representative value. Note that the representative value calculation unit 323 may calculate the representative value by excluding neighboring pixels that may possibly generate RTS noise.

Returning to FIG. 7, the explanation after step S105 will be continued.

In step S105, based on the plurality of candidate values calculated by the candidate value calculation unit 322 in step S103 described above and the representative value calculated by the representative value calculation unit 323 in step S104 described above, the correction value calculation unit 325 executes correction value calculation processing for calculating the pixel value in which the RTS noise in the pixel of interest has been corrected. After step S105, the image processing apparatus 30 proceeds to step S106 described later.

Figure 10:
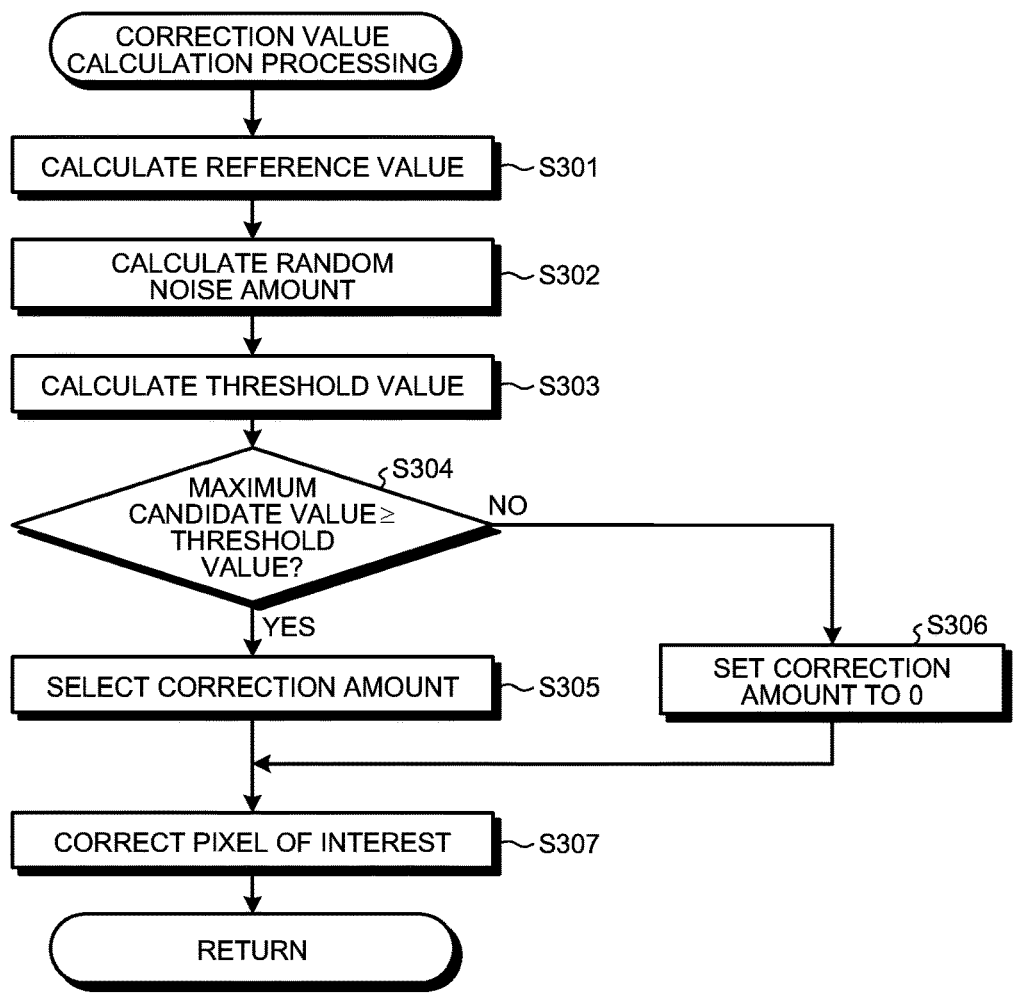
FIG. 10 is a flowchart illustrating an outline of correction value calculation processing in FIG. 7.

FIG. 10 is a flowchart illustrating the outline of correction value calculation processing in step S105 of FIG. 7.

As illustrated in FIG. 10, first, the second reference value calculation unit 325a calculates a value obtained by subtracting RTS_Value (maximum value of the correction amount) from the pixel value of the pixel of interest as a reference value (step S301).

Subsequently, the second random noise amount estimation unit 325b acquires the random noise model recorded in the random noise model information recording unit 112c via the third external I/F unit 31, the first external I/F unit 115, and the bus 113, and calculates the random noise amount based on the acquired random noise model and the reference value calculated by the second reference value calculation unit 325a in step S301 (step S302).

Thereafter, in step S303, the correction amount decision unit 325c calculates a value obtained by multiplying the random noise amount calculated by the second random noise amount estimation unit 325b in step S302 by a certain coefficient, as a threshold value. Here, the threshold value is calculated by the following expression (3).

$$\text{Random noise amount} \times Rm \qquad (3)$$

Rm is decided according to how visually the RTS noise appears to the random noise. For example, the value of Rm is preferably around 2.

Subsequently, the correction amount decision unit 325c determines whether or not the maximum candidate value among the correction amount candidate values calculated by the candidate value calculation unit 322 in step S103 of FIG. 7 described above is equal to or larger than the threshold value calculated in step S303 (step S304). When the correction amount decision unit 325c determines that the maximum candidate value among the correction amount candidate values calculated by the candidate value calculation unit 322 in step S103 of FIG. 7 described above is equal to or larger than the threshold value (step S304: Yes), the image processing apparatus 30 proceeds to step S305 described later. On the other hand, when the correction amount decision unit 325c determines that the maximum candidate value among the correction amount candidate values calculated by the candidate value calculation unit 322 in step S103 of FIG. 7 described above is not equal to or larger than the threshold value (step S304: No), the image processing apparatus 30 proceeds to step S306 described later.

In step S305, the correction amount decision unit 325c selects the candidate value for the correction amount closest to the absolute value of the difference between the representative value calculated by the representative value calculation unit 323 and the pixel value of the pixel of interest in step S104 of FIG. 7 described above, as the correction amount. After step S305, the image processing apparatus 30 proceeds to step S307 described later.

In step S306, the correction amount decision unit 325c sets 0 as the correction amount. After step S306, the image processing apparatus 30 proceeds to step S307.

Subsequently, the pixel value correction unit 325d calculates the pixel value of the corrected pixel of interest by adding or subtracting the pixel value of the pixel of interest by the correction amount so as to approach the representative value (step S307). After step S307, the image processing apparatus 30 returns to the main routine of FIG. 7.

Returning to FIG. 7, the explanation after step S106 will be continued.

In step S106, the RTS noise correction unit 32 determines whether or not the processing of steps S101 to S105 has been ended for all the pixels. When the RTS noise correction unit 32 determines that the processing of steps S101 to S105 has been ended for all the pixels (step S106: Yes), the image processing apparatus 30 ends the present processing. On the other hand, when the RTS noise correction unit 32 determines that the processing of steps S101 to S105 has not been ended for all the pixels (step S106: No), the image processing apparatus 30 returns to step S101 described above.

According to the first embodiment of the present invention described above, the representative value calculation unit 323 estimates the amount of random noise in the pixel of interest based on the RTS_Value related to the RTS noise recorded by the RTS noise information recording unit 112b and the random noise model for estimating the random noise amount in the pixel of interest, and the correction value calculation unit 325 corrects the pixel value of the pixel of interest based on the random noise amount estimated by the representative value calculation unit 323. Therefore, it is possible to correctly estimate the random noise amount even when RTS noise occurs in the pixel of interest.

Furthermore, according to the first embodiment of the present invention, the first reference value calculation unit 323a calculates a reference value for estimating the amount of random noise occurring at the pixel of interest based on the RTS_Value related to the RTS noise recorded by the RTS noise information recording unit 112b and the pixel value of the pixel of interest, and the first random noise amount estimation unit 323b estimates the random noise amount in the pixel of interest based on the reference value calculated by the first reference value calculation unit 323a and the random noise model recorded by the random noise model information recording unit 112c. Therefore, it is possible to correctly estimate the random noise amount even when RTS noise occurs in the pixel of interest.

First Modification of First Embodiment

Next, a first modification of the first embodiment of the present invention will be described. The first modification of the first embodiment has the same configuration as the imaging system 1 according to the first embodiment described above and differs only in the representative value calculation processing executed by the image processing apparatus 30. Therefore, in the following, representative value calculation processing executed by the image processing apparatus 30 according to the first modification of the first embodiment will be described. The same elements as those of the imaging system 1 according to the first embodiment are denoted by the same reference signs, and the description thereof will be omitted.

Figure 11:
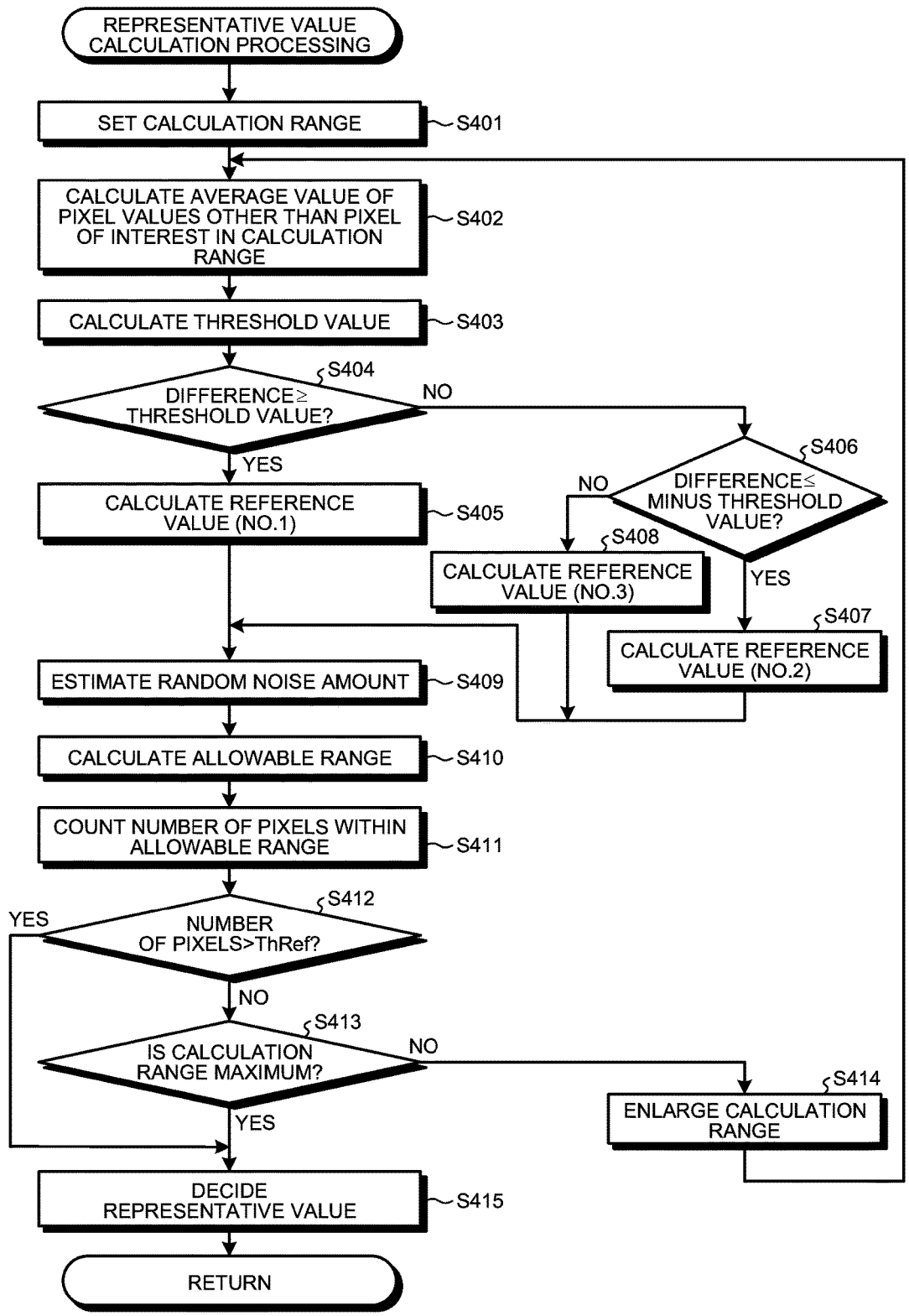
FIG. 11 is a flowchart illustrating an outline of representative value calculation processing executed by an image processing apparatus according to a first modification of the first embodiment of the present invention.

FIG. 11 is a flowchart illustrating an outline of representative value calculation processing executed by the image processing apparatus 30 according to the first modification of the first embodiment.

As illustrated in FIG. 11, first, the representative value calculation unit 323 sets a minimum calculation range to be subjected to the representative value calculation on the basis of the pixel of interest (step S401).

Subsequently, in the calculation range set in step S401, the first reference value calculation unit 323a calculates, as a standard value, an average value of the pixel values other than the pixel of interest (step S402). For example, the first reference value calculation unit 323a calculates the average value of the pixel values other than the pixel of interest based on various average calculation methods such as arithmetic mean and geometric mean. In the calculation range set in step S401, the first reference value calculation unit 323a may perform weighted averaging on pixel values other than the pixel of interest. Furthermore, in the calculation range set in step S401, the first reference value calculation unit 323a may calculate a median value or a mode value of pixel values other than the pixel of interest. In addition, the first reference value calculation unit 323a may include the pixel of interest in the calculation of the average value. In this case, the first reference value calculation unit 323a calculates the average value based on the pixel value within the calculation range even when the RTS noise has occurred in the pixel of interest; therefore, there is no big influence on the comparison with the threshold values in step S404 and step S406 described later.

Thereafter, the first reference value calculation unit 323a calculates a threshold value (step S403). Specifically, the first reference value calculation unit 323a calculates a value obtained by multiplying RTS_Value (the maximum value of the correction amount) of the pixel of interest by a predetermined coefficient of 1 or less, for example, 0.5, as a threshold value.

Subsequently, the first reference value calculation unit 323a determines whether or not the value obtained by subtracting the pixel value of the pixel of interest from the average value calculated in step S402 described above is equal to or larger than the threshold value calculated in step S403 described above (step S404). When the first reference value calculation unit 323a determines that the value obtained by subtracting the pixel value of the pixel of interest from the average value calculated in step S402 is equal to or larger than the threshold value calculated in step S403 (step S404: Yes), the image processing apparatus 30 proceeds to step S405 described later. On the other hand, when the first reference value calculation unit 323a determines that the value obtained by subtracting the pixel value of the pixel of interest from the average value calculated in step S402 is not equal to or larger than the threshold value calculated in step S403 (step S404: No), the image processing apparatus 30 proceeds to step S406 described later.

In step S405, the first reference value calculation unit 323a determines that the RTS noise that is RTS_Value directed in the minus direction is overlapped and calculates a value obtained by adding RTS_Value to the pixel value of the pixel of interest as a reference value (No. 1). After step S405, the image processing apparatus 30 proceeds to step S409 described later.

In step S406, the first reference value calculation unit 323a determines whether or not the value obtained by subtracting the pixel value of the pixel of interest from the average value calculated in step S402 described above is equal to or smaller than the minus threshold value calculated in step S403 described above. When the first reference value calculation unit 323a determines that the value obtained by subtracting the pixel value of the pixel of interest from the average value calculated in step S402 described above is equal to or smaller than the minus threshold value calculated in step S403 described above (step S406: Yes), the image processing apparatus 30 proceeds to step S407 described later. On the other hand, when the first reference value calculation unit 323a determines that the value obtained by subtracting the pixel value of the pixel of interest from the average value calculated in step S402 described above is not equal to or smaller than the threshold value calculated in step S403 described above (step S406: No), the image processing apparatus 30 proceeds to step S408 described later.

In step S407, the first reference value calculation unit 323a determines that the RTS noise that is RTS_Value directed in the plus direction is overlapped and calculates a value obtained by subtracting RTS_Value from the pixel value of the pixel of interest as a reference value (No. 2). After step S407, the image processing apparatus 30 proceeds to step S409 described later.

In step S408, the first reference value calculation unit 323a calculates the pixel value of the pixel of interest as a reference value (No. 3). After step S408, the image processing apparatus 30 proceeds to step S409 described later.

In step S409, based on the reference value and the random noise model calculated by the first reference value calculation unit 323a in any of steps S405, S407, and S408 described above, the first random noise amount estimation unit 323b estimates the random noise amount. After step S409, the image processing apparatus 30 proceeds to step S410.

Since steps S410 to S415 correspond to steps S204 to S209 of FIG. 8 described above, respectively, explanation thereof will be omitted. After step S415, the image processing apparatus 30 returns to the main routine of FIG. 7.

According to the first modification of the first embodiment of the present invention described above, the first reference value calculation unit 323a calculates a value obtained by adjusting the RTS_Value from the pixel value of the pixel of interest as the reference value in accordance with the representative value (threshold value) which is the average value of the pixel values within the calculation range in the calculation range to be subjected to the representative value calculation on the basis of the pixel of interest. Therefore, it is possible to correctly estimate the random noise amount even when RTS noise occurs in the pixel of interest.

Further, according to the first modification of the first embodiment of the present invention, the first reference value calculation unit 323a adds the RTS_Value to the pixel value of the pixel of interest when the pixel value of the pixel of interest is smaller than the threshold value which is the average value of the pixel values within the calculation range in the calculation range to be subjected to the representative value calculation. On the other hand, when the pixel value is larger than the threshold value, the first reference value calculation unit 323a subtracts the RTS_Value from the pixel value of the RAW image of the pixel of interest. Therefore, it is possible to correctly estimate the amount of random noise even when RTS noise occurs in the pixel of interest.

Second Modification of First Embodiment

Next, a second modification of the first embodiment of the present invention will be described. The second modification of the first embodiment has the same configuration as the imaging system 1 according to the first embodiment described above and differs only in the representative value calculation processing executed by the image processing apparatus 30. Therefore, in the following, representative value calculation processing executed by the image processing apparatus 30 according to the second modification of the first embodiment will be described. The same elements as those of the imaging system 1 according to the first embodiment are denoted by the same reference signs, and the explanation thereof will be omitted.

Figure 12:
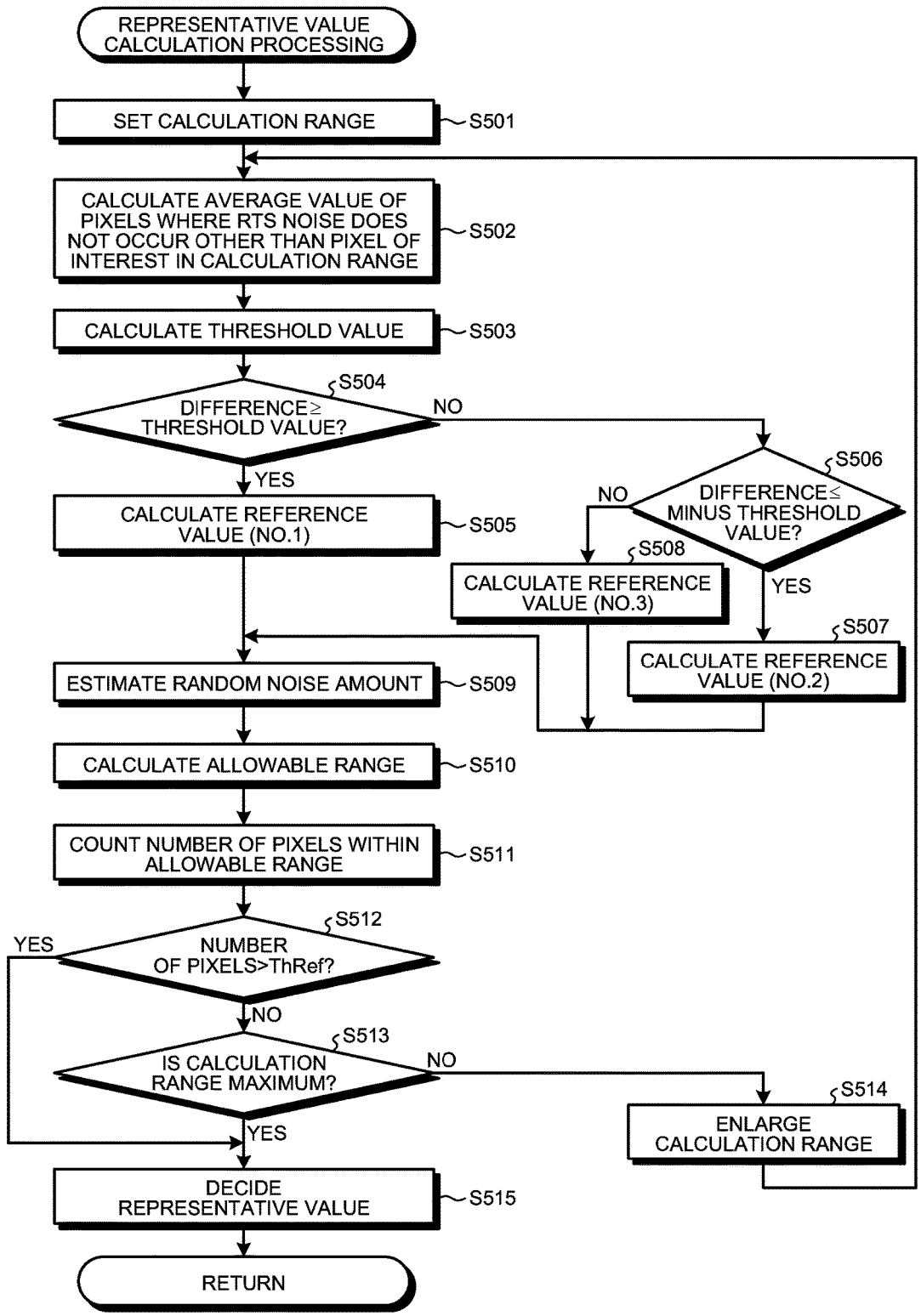
FIG. 12 is a flowchart illustrating an outline of representative value calculation processing executed by an image processing apparatus according to a second modification of the first embodiment of the present invention.

FIG. 12 is a flowchart illustrating an outline of representative value calculation processing executed by the image processing apparatus 30 according to the second modification of the first embodiment.

First, the representative value calculation unit 323 sets a minimum calculation range to be subjected to the representative value calculation on the basis of the pixel of interest (step S501).

Subsequently, the first reference value calculation unit 323a calculates, as a standard value, an average value of the pixel values of the pixels where RTS noise does not occur other the pixel of interest in the calculation range set in step S501 (step S502). For example, the first reference value calculation unit 323a calculates the average value of the pixel values other than the pixel of interest based on various average calculation methods such as arithmetic mean and geometric mean. In the calculation range set in step S501, the first reference value calculation unit 323a may perform weighted averaging on pixel values of pixels where RTS noise does not occur, other than the pixel of interest. Furthermore, in the calculation range set in step S501, the first reference value calculation unit 323a may calculate a median value or a mode value of the pixel values of pixels where RTS noise does not occur, other than the pixel of interest.

Step S503 corresponds to step S403 in FIG. 11 described above. After step S503, the image processing apparatus 30 proceeds to step S504.

Subsequently, the first reference value calculation unit 323a determines whether or not the value obtained by subtracting the pixel value of the pixel of interest from the average value calculated in step S502 is equal to or larger than the threshold value calculated in step S503 (step S504). When the first reference value calculation unit 323a determines that the value obtained by subtracting the pixel value of the pixel of interest from the average value calculated in step S502 is equal to or larger than the threshold value calculated in step S503 (step S504: Yes), the image processing apparatus 30 proceeds to step S505 described later. On the other hand, when the first reference value calculation unit 323a determines that the value obtained by subtracting the pixel value of the pixel of interest from the average value calculated in step S502 is not equal to or larger than the threshold value calculated in step S503 (step S504: No), the image processing apparatus 30 proceeds to step S506 described later.

In step S505, the first reference value calculation unit 323a determines that the RTS noise that is RTS_Value directed in the minus direction is overlapped, and calculates a value obtained by adding RTS_Value to the pixel value of the pixel of interest as a reference value (No. 1). After step S505, the image processing apparatus 30 proceeds to step S509 described later.

In step S506, the first reference value calculation unit 323a determines whether or not the value obtained by subtracting the pixel value of the pixel of interest from the average value calculated in step S502 is equal to or smaller than the threshold value calculated in step S503. When the first reference value calculation unit 323a determines that the value obtained by subtracting the pixel value of the pixel of interest from the average value calculated in step S502 is equal to or smaller than the threshold value calculated in step S503 (step S506: Yes), the image processing apparatus 30 proceeds to step S507 described later. On the other hand, when the first reference value calculation unit 323a determines that the value obtained by subtracting the pixel value of the pixel of interest from the average value calculated in step S502 is not equal to or smaller than the threshold value calculated in step S503 (step S506: No), the image processing apparatus 30 proceeds to step S508 described later.

In step S507, the first reference value calculation unit 323a determines that the RTS noise that is RTS_Value directed in the plus direction is overlapped, and calculates a value obtained by subtracting RTS_Value from the pixel value of the pixel of interest as a reference value (No. 2). After step S507, the image processing apparatus 30 proceeds to step S509 described later.

In step S508, the first reference value calculation unit 323a calculates the pixel value of the pixel of interest as a reference value (No. 3). After step S508, the image processing apparatus 30 proceeds to step S509 described later.

In step S509, based on the reference value and the random noise model calculated by the first reference value calculation unit 323a in any of steps S505, S507, and S508 described above, the first random noise amount estimation unit 323b estimates the random noise amount. After step S509, the image processing apparatus 30 proceeds to step S510.

Steps S510 to S515 correspond to steps S204 to S209 of FIG. 8 described above, respectively. After step S515, the image processing apparatus 30 returns to the main routine of FIG. 7.

According to the second modification of the first embodiment of the present invention described above, the first reference value calculation unit 323a calculates the reference value by adjusting the RTS_Value from the pixel value of the pixel of interest in accordance with the standard value (threshold value) which is the average value calculated using the pixel values of the pixels where RTS noise does not occur, in the calculation range to be subjected to the representative value calculation on the basis of the pixel of interest. Therefore, it is possible to correctly estimate the random noise amount even when RTS noise occurs in the pixel of interest.

Further, according to the second modification of the first embodiment of the present invention, the first reference value calculation unit 323a adds RTS_Value to the pixel value of the pixel of interest when the pixel value is smaller than the threshold value which is the average value calculated using the pixel value of the pixel where RTS noise does not occur in the calculation range to be subjected to the representative value calculation on the basis of the pixel of interest. On the other hand, when the pixel value is larger than the threshold value, the first reference value calculation unit 323a subtracts RTS_Value from the pixel value of the pixel of interest. Therefore, it is possible to correctly estimate the random noise amount even when RTS noise occurs in the pixel of interest.

Third Modification of First Embodiment

Next, a third modification of the first embodiment of the present invention will be described. The third modification of the first embodiment has the same configuration as the imaging system 1 according to the first embodiment described above and differs only in the correction value calculation processing executed by the image processing apparatus 30. Therefore, in the following, correction value calculation processing executed by the image processing apparatus according to the third modification of the first embodiment will be described. The same elements as those of the imaging system 1 according to the first embodiment are denoted by the same reference signs, and the explanation thereof will be omitted.

Figure 13:
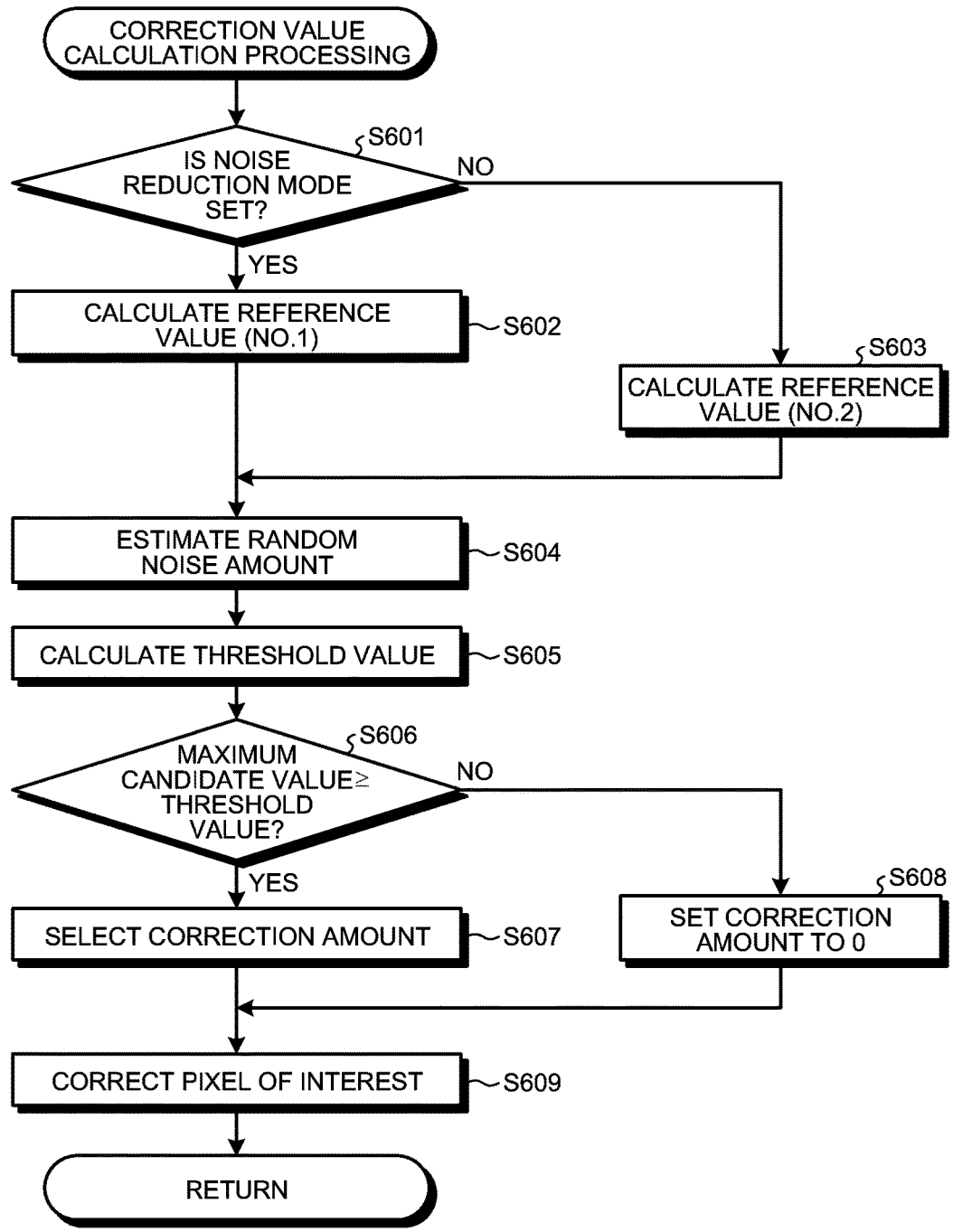
FIG. 13 is a flowchart illustrating an outline of correction value calculation processing executed by an image processing apparatus according to a third modification of the first embodiment.

FIG. 13 is a flowchart illustrating an outline of correction value calculation processing executed by the image processing apparatus 30 according to a third modification of the first embodiment.

As illustrated in FIG. 13, the correction value calculation unit 325 determines whether or not the noise reduction mode is set for the image processing apparatus 30 (step S601). Specifically, the correction value calculation unit 325 determines whether or not a noise reduction mode for preferentially reducing the noise superimposed on the pixel value of the pixel is set by the user operating an operating unit 334. When the correction value calculation unit 325 determines that the noise reduction mode is set for the image processing apparatus 30 (step S601: Yes), the image processing apparatus 30 proceeds to step S602 described later. On the other hand, when the correction value calculation unit 325 determines that the noise reduction mode is not set for the image processing apparatus 30, that is, when the correction value calculation unit 325 determines that an overcorrection prevention mode for preventing excessive correction of the pixel of interest is selected (step S601: No), the image processing apparatus 30 proceeds to step S603 described later.

In step S602, the second reference value calculation unit 325a calculates a value obtained by subtracting RTS_Value (maximum value of the correction amount) from the pixel value of the pixel of interest as a reference value. After step S602, the image processing apparatus 30 proceeds to step S604 described later.

In step S603, the second reference value calculation unit 325a calculates a reference value by subtracing RTS_Value (maximum value of the correction amounts) from the pixel value of the pixel of interest. After step S603, the image processing apparatus 30 proceeds to step S604 described later.

Steps S604 to S609 correspond to steps S302 to S307 of FIG. 10, respectively. After step S609, the image processing apparatus 30 returns to the main routine of FIG. 7.

According to the third modification of the first embodiment of the present invention described above, when a noise reduction priority mode is selected according to the operation of the operating unit 34, the second reference value calculation unit 325a calculates the reference value by adding RTS_Value to the pixel value of the pixel of interest. On the other hand, when an overcorrection prevention mode is selected according to the operation of the operating unit 34, the second reference value calculation unit 325a calculates the reference value by subtracting RTS_Value from the pixel value of the pixel of interest. Then, by referring to the noise model using the reference value calculated by the second reference value calculation unit 325a, the correction amount is decided. Therefore, even when RTS noise occurs in the pixel of interest, correction can be made according to the desires of the user.

Second Embodiment

A second embodiment of the present invention will be described. An imaging system of the second embodiment is different from that of the first embodiment in configurations of a representative value calculation unit and a correction value calculation unit of an image processing apparatus and in representative value calculation processing. Therefore, in the following, representative value calculation processing will be described after describing the configurations of the representative value calculation unit and the correction value calculation unit according to the second embodiment. The same elements as those of the imaging system 1 according to the first embodiment are denoted by the same reference signs, and the explanation thereof will be omitted.

Figure 14:
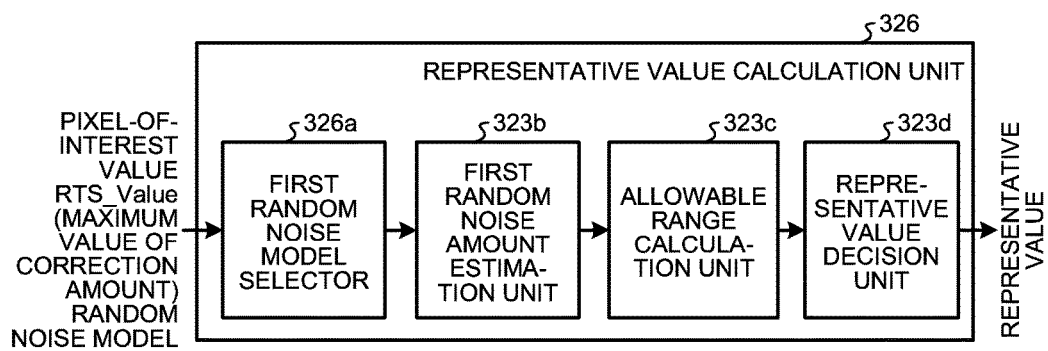
FIG. 14 is a block diagram illustrating a detailed configuration of a representative value calculation unit according to a second embodiment of the present invention.

First, the configuration of the representative value calculation unit will be described. FIG. 14 is a block diagram illustrating a detailed configuration of the representative value calculation unit according to the second embodiment of the present invention. A representative value calculation unit 326 illustrated in FIG. 14 has a first random noise model selector 326a in place of the first reference value calculation unit 323a of the representative value calculation unit 323 according to the first embodiment.

In the calculation range set with reference to the pixel of interest, the first random noise model selector 326a selects one of a plurality of random noise models recorded by the random noise model information recording unit 112c via the third external I/F unit 31, the first external I/F unit 115, and the bus 113 based on the average value of the pixel value of the pixel where RTS noise does not occur other than the pixel of interest.

Figure 15:
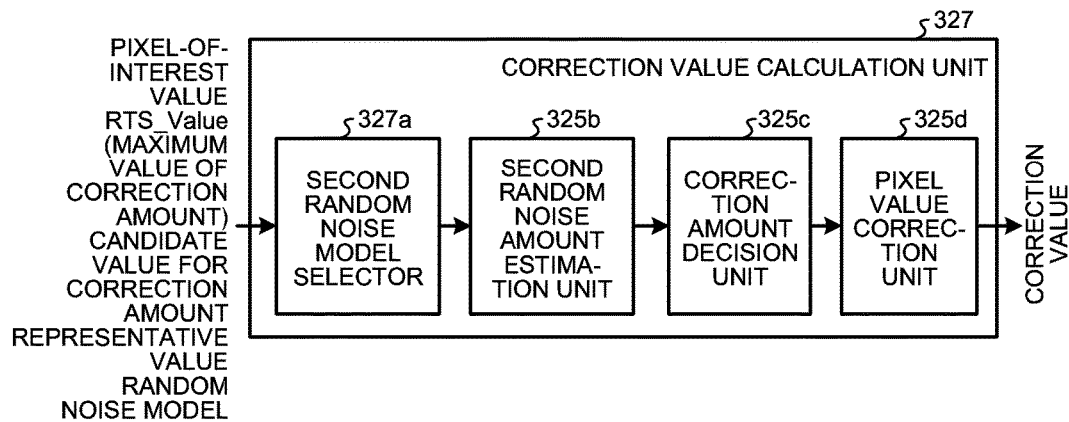
FIG. 15 is a block diagram illustrating a detailed configuration of a correction value calculation unit according to the second embodiment of the present invention.

Next, the configuration of the correction value calculation unit will be described. FIG. 15 is a block diagram illustrating a detailed configuration of the correction value calculation unit according to the second embodiment of the present invention. A correction value calculation unit 327 illustrated in FIG. 15 has a second random noise model selector 327a in place of the second reference value calculation unit 325a of the correction value calculation unit 325.

In the set calculation range, the second random noise model selector 327a selects one of a plurality of random noise models recorded by the random noise model information recording unit 112c via the third external I/F unit 31, the first external I/F unit 115, and the bus 113 based on the average value of the pixel value of the pixel where RTS noise does not occur other than the pixel of interest.

Processing of Image Processing Apparatus

Figure 16:
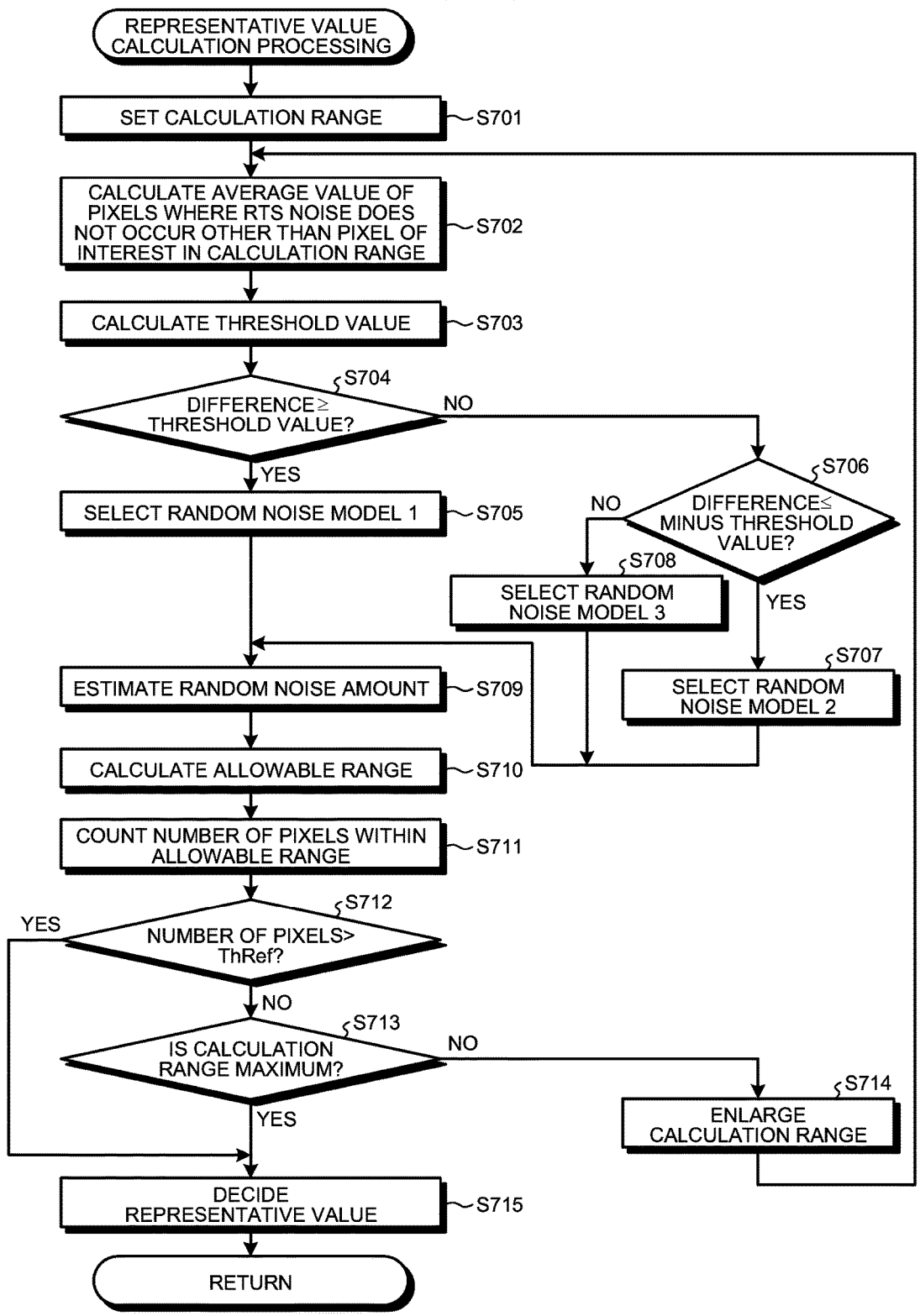
FIG. 16 is a flowchart illustrating an outline of representative value calculation processing executed by an image processing apparatus according to the second embodiment of the present invention.

Next, representative value calculation processing executed by the image processing apparatus 30 will be described. FIG. 16 is a flowchart illustrating an outline of the representative value calculation processing executed by the image processing apparatus 30.

As illustrated in FIG. 16, first, the representative value calculation unit 326 sets a minimum calculation range to be subjected to the representative value calculation on the basis of the pixel of interest (step S701).

Subsequently, in the calculation range set in step S701, the first random noise model selector 326a calculates, as a standard value, an average value of the pixel values of the pixels where RTS noise does not occur other than the pixel of interest (step S702). For example, the first random noise model selector 326a calculates an average value of the pixel value of pixel where the RTS noise does not occur other than the pixel of interest based on various average calculation methods such as arithmetic mean and geometric mean. In the calculation range set in step S701, the first random noise model selector 326a may perform weighted averaging on pixel values of pixels where RTS noise does not occur, other than the pixel of interest. Furthermore, in the calculation range set in step S701, the first random noise model selector 326a may calculate a median value or a mode value of the pixel values of pixels where RTS noise does not occur, other than the pixel of interest. In addition, in the calculation range set in step S701, the first random noise model selector 326a may calculate the average value, the weighted average, the median value, and the mode value for pixels where RTS noise is likely to occur, including the pixel of interest.

Thereafter, the first random noise model selector 326a calculates a threshold value (step S703). Specifically, the first random noise model selector 326a calculates a value obtained by multiplying RTS_Value (the maximum value of the correction amount) of the pixel of interest by a predetermined coefficient of 1 or less, for example, 0.5, as a threshold value.

Subsequently, the first random noise model selector 326a determines whether or not the value obtained by subtracting the pixel value of the pixel of interest from the average value calculated in step S702 described above is equal to or larger than the threshold value calculated in step S703 described above (step S704). When the first random noise model selector 326a determines that the value obtained by subtracting the pixel value of the pixel of interest from the average value calculated in step S702 described above is equal to or larger than the threshold value calculated in step S703 described above (step S704: Yes), the image processing apparatus 30 proceeds to step S705 described later. On the other hand, when the first random noise model selector 326a determines that the value obtained by subtracting the pixel value of the pixel of interest from the average value calculated in step S702 described above is not equal to or larger than the threshold value calculated in step S703 described above (step S704: No), the image processing apparatus 30 proceeds to step S706 described later.

In step S705, the first random noise model selector 326a determines that the RTS noise that is RTS_Value directed in the minus direction is overlapped, and selects and acquires a random noise model 1 in which the pixel value is shifted in the minus direction as a whole from a plurality of random noise models recorded by the random noise model information recording unit 112c via the third external I/F unit 31, the first external I/F unit 115, and the bus 113.

Figure 17:
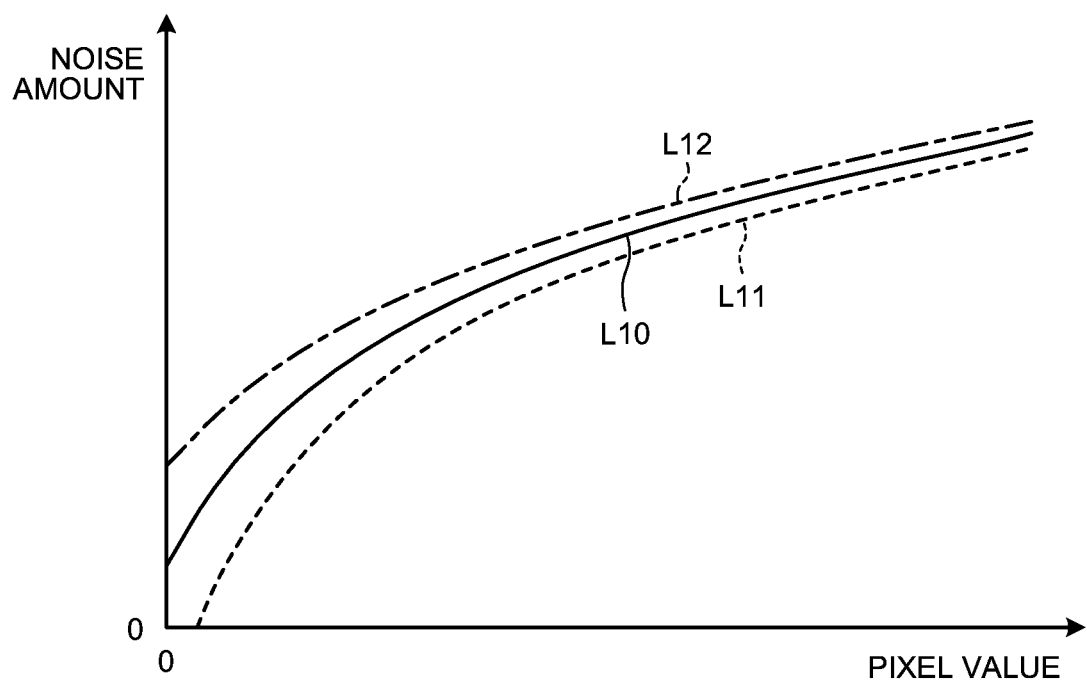
FIG. 17 is a diagram illustrating an example of a random noise model according to the second embodiment of the present invention.

FIG. 17 is a diagram illustrating an example of a random noise model. In FIG. 17, a vertical axis represents a noise amount and a horizontal axis represents a pixel value. In FIG. 17, the standard deviation of the pixel value is used as the random noise amount on the vertical axis, and a plurality of random noise models corresponding to the characteristics of the image sensor 105 are illustrated.

As illustrated in FIG. 17, the first random noise model selector 326a selects, from a plurality of random noise models L10 to L12 that the random noise model information recording unit 112c records in association with the amplitude of the RTS noise, the random noise model L12 corresponding to a case where the RTS noise that is RTS_Value directed in the minus direction is overlapped, and acquires the selected random noise model L12 from the random noise model information recording unit 112c. After step S705, the image processing apparatus 30 proceeds to step S709 described later.

In step S706, the first random noise model selector 326a determines whether or not the value obtained by subtracting the pixel value of the pixel of interest from the average value calculated in step S702 described above is equal to or smaller than the minus threshold value calculated in step S703 described above. When the first random noise model selector 326a determines that the value obtained by subtracting the pixel value of the pixel of interest from the average value calculated in step S702 is equal to or smaller than the minus threshold calculated in step S703 described above (step S706: Yes), the image processing apparatus 30 proceeds to step S707 described later. On the other hand, when the first random noise model selector 326a determines that the value obtained by subtracting the pixel value of the pixel of interest from the average value calculated in step S702 is not equal to or smaller than the minus threshold calculated in step S703 described above (In step S706: No), the image processing apparatus 30 proceeds to step S708 described later.

In step S707, the first random noise model selector 326a determines that the RTS noise that is RTS_Value directed in the plus direction is overlapped, and selects and acquires a random noise model 2 in which the pixel value is shifted in the plus direction as a whole from a plurality of random noise models recorded by the random noise model information recording unit 112c via the third external I/F unit 31, the first external I/F unit 115, and the bus 113. More specifically, the first random noise model selector 326a selects, from a plurality of random noise models L10 to L12 that the random noise model information recording unit 112c records, the random noise model L11 corresponding to a case where the RTS noise that is RTS_Value directed in the plus direction is overlapped, and acquires the selected random noise model L11 from the random noise model information recording unit 112c. After step S707, the image processing apparatus 30 proceeds to step S709 described later.

In step S708, the first random noise model selector 326a selects and acquires a normal random noise model 3 from a plurality of random noise models recorded by the random noise model information recording unit 112c via the third external I/F unit 31, the first external I/F unit 115, and the bus 113. More specifically, as illustrated in FIG. 17, the first random noise model selector 326a selects, from a plurality of random noise models L10 to L12 that the random noise model information recording unit 112c records, the random noise model L10 corresponding to a normal case, and acquires the selected random noise model L10 from the random noise model information recording unit 112c. After step S708, the image processing apparatus 30 proceeds to step S709 described later.

In step S709, the first random noise amount estimation unit 323b estimates the random noise amount of the pixel value of the pixel of interest based on the random noise model selected by the first random noise model selector 326a and the pixel value of the pixel of interest in any of steps S705, S707, and S708 described above.

Steps S710 to S715 correspond to steps S204 to S209 of FIG. 8 described above, respectively. After step S715, the image processing apparatus 30 returns to the main routine of FIG. 7.

According to the second embodiment of the present invention described above, in the calculation range set with reference to the pixel of interest, the first random noise model selector 326a selects one of a plurality of random noise models recorded by the random noise model information recording unit 112c via the third external I/F unit 31, the first external I/F unit 115, and the bus 113 based on the average value of the pixel value of the pixel where RTS noise does not occur other than the pixel of interest, and the first random noise amount estimation unit 323b estimates the random noise amount in the pixel of interest based on the random noise model selected by the first random noise model selector 326a and the pixel value of the pixel of interest. Therefore, it is possible to correctly estimate the random noise amount even when RTS noise occurs in the pixel of interest.

Third Embodiment

Next, a third embodiment of the present invention will be described. In the first embodiment, the image processing apparatus 30 is separately provided, but in the third embodiment, the image processing apparatus is provided in the main body of the imaging apparatus. Therefore, in the following description, the same elements as those of the imaging system 1 according to the first embodiment are denoted by the same reference signs, and the explanation thereof will be omitted.

Configuration of Imaging System

Figure 18:
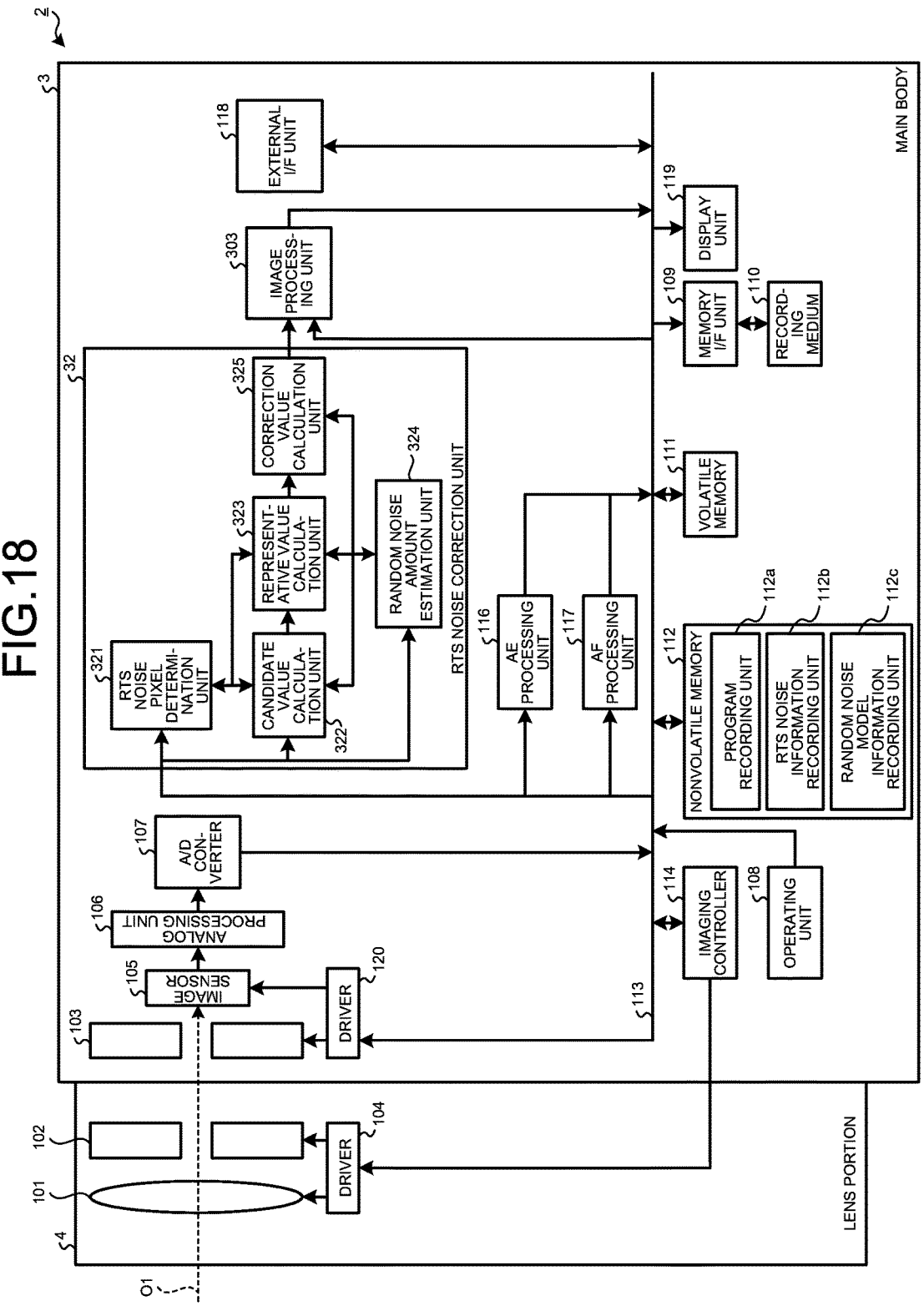
FIG. 18 is a block diagram schematically illustrating a configuration of an imaging system according to a third embodiment of the present invention.

FIG. 18 is a block diagram schematically illustrating a configuration of an imaging system 2 according to the third embodiment of the present invention. The imaging system 2 illustrated in FIG. 18 includes a main body 3 and a lens portion 4 detachably connectable to the main body 3.

Configuration of Main Body

The main body 3 includes the shutter 103, the image sensor 105, the analog processing unit 106, the A/D converter 107, the operating unit 108, the memory I/F unit 109, the recording medium 110, the volatile memory 111, the nonvolatile memory 112, the bus 113, the imaging controller 114, an AE processing unit 116, an AF processing unit 117, an external I/F unit 118, a display unit 119, a driver 120, and an RTS noise correction unit 32. The driver 120 drives the shutter 103 under the control of the imaging controller 114.

The AE processing unit 116 acquires the image data stored in the volatile memory 111 via the bus 113, and sets an exposure condition for capturing still image or a moving image based on the acquired image data. Specifically, the AE processing unit 116 calculates the luminance from the image data, and executes automatic exposure (Auto Exposure) of the imaging system 2, for example, by deciding a diaphragm value, an exposure time, an ISO sensitivity and the like based on the calculated luminance.

The AF processing unit 117 acquires the image data stored in the volatile memory 111 via the bus 113 and adjusts the automatic focus of the imaging system 2 based on the acquired image data. For example, the AF processing unit 117 extracts a high frequency component signal from the image data and executes auto focus (AF) calculation processing on the high frequency component signal, thereby deciding the focus evaluation of the imaging system 2. Accordingly, the AF processing unit 117 adjusts the autofocus of the imaging system 2. Note that in the automatic focus adjustment method of the imaging system 2, a phase difference signal may be acquired by the image sensor 105.

The external I/F unit 118 can execute reading and writing of data in various blocks in the main body 3, control by a dedicated command, and the like. The external I/F unit 118 is an interface that can control various blocks in the main body 3 by connecting an exclusive circuit on which an FPGA, a DSP, a GPU or the like is mounted or an external device such as a personal computer (PC).

The display unit 119 includes a display panel made of liquid crystal or organic electro luminescence (EL). The display unit 119 displays an image corresponding to the image data generated by the image sensor 105.

Configuration of Lens Portion

As illustrated in FIG. 18, the lens portion 4 forms an image of a subject collected from a predetermined field of view region on the image sensor 105. The optical system 101, the diaphragm 102, and the driver 104 are provided.

Processing of Imaging System

Figure 19:
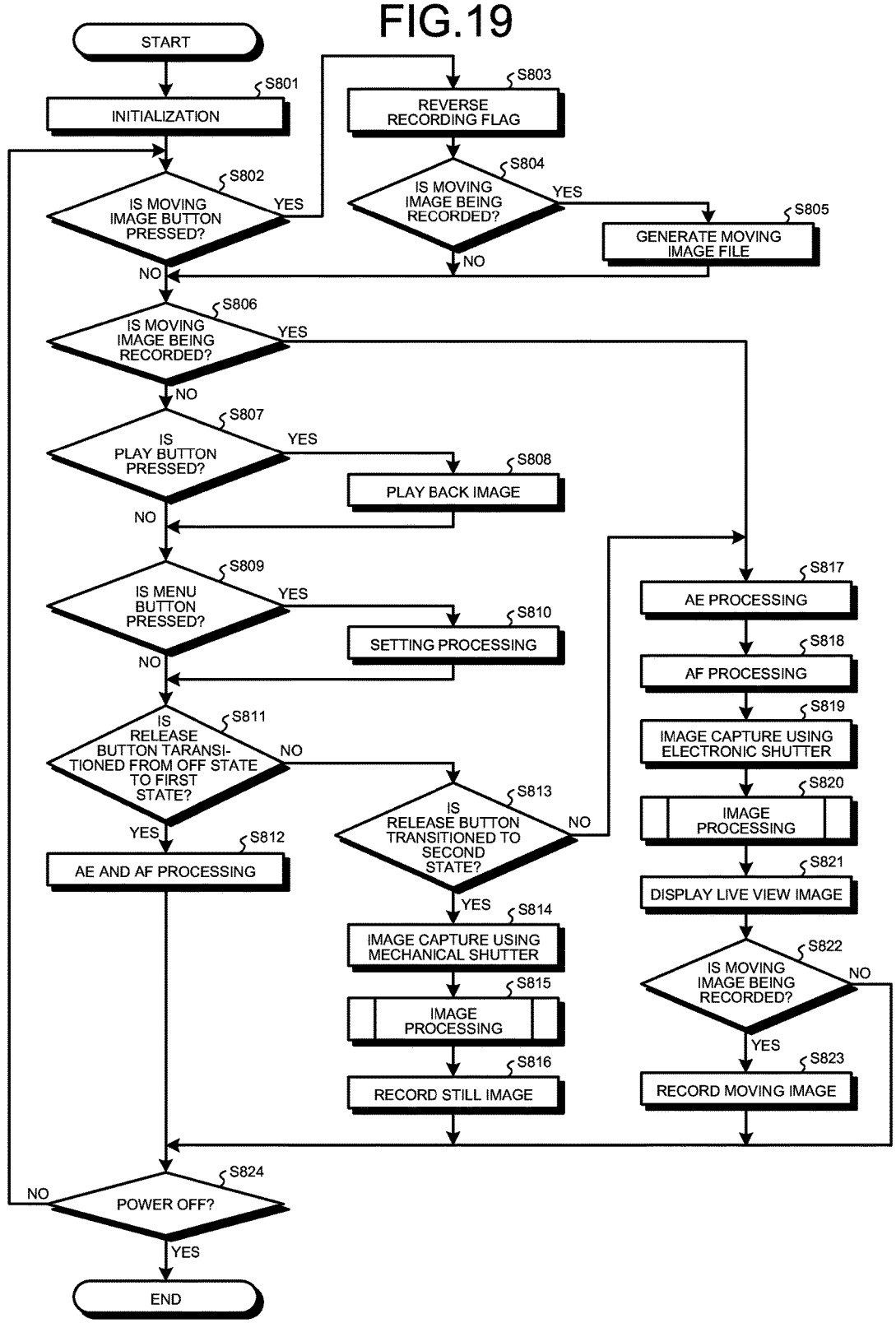
FIG. 19 is a flowchart illustrating an outline of processing executed by the imaging system according to the third embodiment of the present invention.

Next, processing executed by the imaging system 2 will be described. FIG. 19 is a flowchart illustrating an outline of processing executed by the imaging system 2.

As illustrated in FIG. 19, first, when the user operates a power button (not illustrated) of the operating unit 108 to turn on the power supply of the main body 3, the imaging controller 114 initializes the imaging system 2 (step S801). Specifically, the imaging controller 114 executes initialization to turn off a recording flag indicating that the moving image is being recorded. This recording flag is a flag which is turned on during capturing a moving image and is turned off when the moving image is not being captured, and is stored in the volatile memory 111.

Subsequently, when a moving image button of the operating unit 108 is pressed (step S802: Yes), the imaging controller 114 reverses the recording flag indicating that the moving image is being recorded in the on state (step S803). The imaging controller 114 determines whether or not the imaging system 2 is recording the moving image (step S804). Specifically, the imaging controller 114 determines whether or not the recording flag stored in the volatile memory 111 is in the on state. When the imaging controller 114 determines that the imaging system 2 is recording a moving image (step S804: Yes), the imaging system 2 proceeds to step S805 described later. On the other hand, when the imaging controller 114 determines that the imaging system 2 is not recording a moving image (step S804: No), the imaging system 2 proceeds to step S806 described later.

In step S805, the imaging controller 114 generates a moving image file for recording the image data in the recording medium 110 in time series. After step S805, the imaging system 2 proceeds to step S806 described later.

In step S802, when the moving image button of the operating unit 108 is not pressed (step S802: No), the imaging system 2 proceeds to step S806.

Subsequently, the imaging controller 114 determines whether or not the imaging system 2 is recording a moving image (step S806). When the imaging controller 114 determines that the imaging system 2 is recording a moving image (step S806: Yes), the imaging system 2 proceeds to step S817 described later. On the other hand, when the imaging controller 114 determines that the imaging system 2 is not recording a moving image (step S806: No), the imaging system 2 proceeds to step S807 described later.

In step S807, when a play button of the operating unit 108 is pressed (step S807: Yes), the imaging system 2 causes the display unit 119 to play back and display an image corresponding to the image data recorded in the recording medium 110 (step S808). After step S808, the imaging system 2 proceeds to step S809 described later.

In step S807, when the play button of the operating unit 108 is not pressed (step S807: No), the imaging system 2 proceeds to step S809.

Subsequently, when a menu button of the operating unit 108 is pressed (step S809: Yes), the imaging system 2 executes a setting processing to set various settings (step S810). After step S810, the imaging system 2 proceeds to step S811 described later.

In step S809, when the menu button of the operating unit 108 is not pressed (step S809: No), the imaging system 2 proceeds to step S811.

In step S811, when a release button of the operating unit 108 is transitioned from the off state to a first state (step S811: Yes), the imaging controller 114 causes the AE processing unit 116 to execute the AE processing for adjusting the exposure and the AF processing for adjusting the focus on the AF processing unit 117 (step S812). Thereafter, the imaging system 2 proceeds to step S824 described later.

In step S811, when the release button of the operating unit 108 is not transitioned from the off state to the first state (step S811: No), the imaging system 2 proceeds to step S813.

Subsequently, when the release button of the operating unit 108 is transitioned to a second state (step S813: Yes), the imaging controller 114 executes capturing of an imaging by a mechanical shutter (step S814). Specifically, the imaging controller 114 causes the image sensor 105 to execute imaging by controlling the shutter 103.

Subsequently, the imaging system 2 executes RTS noise correction on the image data generated by the image sensor 105, and thereafter executes image processing for executing predetermined processing (step S815). The details of the image processing described later.

Thereafter, the imaging controller 114 records the image data on which the image processing has been executed by an image processing unit 303, on the recording medium 110 (step S816). After step S816, the imaging system 2 proceeds to step S824 described later.

In step S813, when the release button of the operating unit 108 is not transitioned to the second state (step S813: No), the imaging system 2 proceeds to step S817.

Subsequently, the imaging controller 114 causes the AE processing unit 116 to execute the AE processing for adjusting the exposure (step S817), and causes the AF processing unit 117 to execute the AF processing for adjusting the focus (step S818).

Thereafter, the imaging controller 114 causes the image sensor 105 to perform image capture using an electronic shutter, which electronically controls the exposure time via the driver 120 (step S819). The image data generated by the image sensor 105 by the image capture using the electronic shutter is output to the volatile memory 111 via the analog processing unit 106, the A/D converter 107, and the bus 113.

Subsequently, the imaging system 2 executes the same image processing as in step S815 (step S820). The details of the image processing described later.

Thereafter, the imaging system 2 causes the display unit 119 to display a live view image corresponding to the image data generated by the image sensor 105 by imaging with the electronic shutter (step S821).

Subsequently, when the imaging system 2 is recording a moving image (step S822: Yes), the imaging controller 114 causes an image compression developing unit (not illustrated) to compress the image data in a recording format set by setting processing of step S1010, and records the compressed image data as a moving image in a moving image file generated in the recording medium 110 (step S823). After step S823, the imaging system 2 proceeds to step S824.

In step S822, when the imaging system 2 is not recording a moving image (step S822: No), the imaging system 2 proceeds to step S824.

Subsequently, when the power button of the operating unit 108 is pressed and the power of the imaging system 2 is turned off (step S824: Yes), the imaging system 2 ends the present processing. On the other hand, when the power supply of the imaging system 2 is not turned off (step S824: No), the imaging system 2 returns to step S802.

Figure 20:
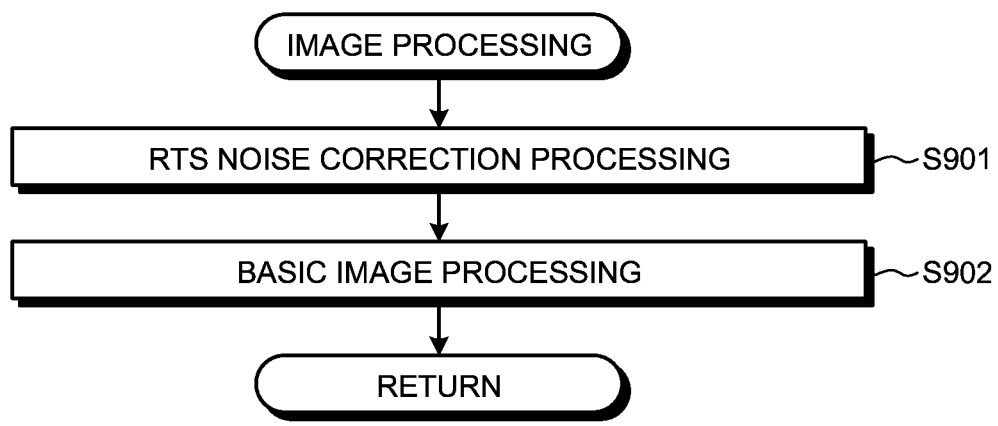
FIG. 20 is a flowchart illustrating an outline of image processing in FIG. 19.

Next, the image processing explained in step S815 and step S820 in FIG. 19 will be described. FIG. 20 is a flowchart illustrating an outline of image processing.

As illustrated in FIG. 18, the RTS noise correction unit 32 executes RTS noise correction processing for correcting RTS noise on the image data generated by the image sensor 105 (step S901). Here, the RTS noise correction processing corresponds to the processing executed by the image processing apparatus 30 according to the first embodiment; therefore, an explanation thereof is omitted.

Subsequently, the image processing unit 303 executes basic image processing on the image data whose RTS noise has been corrected by the RTS noise correction unit 32 (step S902). After step S902, the imaging system 2 returns to the main routine in FIG. 19.

According to the third embodiment of the present invention described above, the same advantageous effects as those of the first embodiment are obtained.

Other Embodiments

The present invention is not limited to the above-described embodiments, and it goes without saying that various modifications and applications are possible within the scope of the gist of the present invention. For example, besides the imaging apparatus used in the explanation of the present invention, the present invention can be applied to any device capable of imaging a subject such as a portable device having an image sensor in a mobile phone or a smartphone, an imaging apparatus for capturing an image of a subject through an optical device such as a video camera, an endoscope, a surveillance camera, or a microscope, and the like.

In the embodiments, the reference value of the random noise model or the noise model to be referred to is changed in accordance with the maximum value of the candidate value which is a value based on RTS_Value which is feature data of RTS noise or RTS_Value. Alternatively, by combining these values, a random noise model may be selected according to the feature quantity of RTS noise, and the random noise amount may be estimated by further changing the reference value. Also, since the random noise amount fluctuates in accordance with the temperature, a random noise model may be selected in accordance with the temperature of the image sensor when the image data is captured, and the above method may be applied.

Further, in the embodiments, the RTS noise information recording unit is provided in the imaging apparatus, but it may be provided in the above-described image processing apparatus, and an RTS noise information recording unit may be provided in a server capable of bidirectional communication via a network so as to acquire RTS noise information via the network.

In some embodiments, image data other than image data used for display or recording may be employed, such as image data of the OB region, or image data of a region outside the image circle not optically designed and guaranteed.

Further, in the explanation of each operation flowchart described above, for the sake of convenience, the operation is described using "first", "next", "followed by", "after", and the like, but this does not mean that it is indispensable to execute the operation in this order.

In addition, each of the processing methods by the image processing apparatus according to the above-described embodiments, that is, the processing described in each flowchart, can be stored as a program that can be executed by a control unit such as a CPU. In addition, each processing may be stored in a storage medium of an external storage device such as a memory card (ROM card, RAM card, or the like), magnetic disk (floppy (registered trademark) disk, hard disk etc.), optical disk (CD-ROM, DVD, or the like) and then distributed. Then, the control unit such as the CPU reads the program stored in the storage medium of the external storage device, and the operation is controlled by the read program so that the above-described processing can be executed.

According to some embodiments, it is possible to correctly estimate the random noise amount even when RTS noise occurs in the pixel of interest.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for correcting blinking defect noise contained in image data generated by an image sensor, the image sensor comprising: a plurality of pixels arranged two-dimensionally and configured to receive light to generate a signal in accordance with an amount of the received light; and a plurality of reading circuits configured to read the signal as a pixel value, the image processing apparatus comprising:

an information acquisition unit configured to acquire noise information that is defined by associating positional information of the plurality of reading circuits or positional information of each of the plurality of pixels with feature data related to the blinking defect noise caused by the plurality of reading circuits;

an estimation unit configured to estimate a random noise amount in a pixel of interest based on the feature data acquired by the information acquisition unit and a random noise model for estimating the random noise amount in the pixel of interest; and a correction unit configured to correct a pixel value of the pixel of interest based on the random noise amount estimated by the estimation unit.

2. The image processing apparatus according to claim 1, further comprising a calculation unit configured to calculate a reference value used for estimating the random noise amount, based on the feature data acquired by the information acquisition unit and the pixel value of the pixel of interest, wherein
the estimation unit is configured to estimate the random noise amount in the pixel of interest based on the reference value calculated by the calculation unit and the random noise model.

3. The image processing apparatus according to claim 2, wherein
the calculation unit is configured to calculate the reference value by offsetting the feature data from the pixel value of the pixel of interest in accordance with the pixel value of the pixel of interest and a standard value calculated using pixel values of pixels in a calculation range that is set with reference to the pixel of interest.

4. The image processing apparatus according to claim 3, wherein
if the pixel value of the pixel of interest is smaller than the standard value, the calculation unit is configured to calculate the reference value by adding the feature data to the pixel value of the pixel of interest.

5. The image processing apparatus according to claim 3, wherein
if the pixel value of the pixel of interest is larger than the standard value, the calculation unit is configured to calculate the reference value by subtracting the feature data from the pixel value of the pixel of interest.

6. The image processing apparatus according to claim 2, wherein
the calculation unit is configured to change a method for calculating the reference value in accordance with a standard value calculated using pixel values of pixels where the blinking defect noise does not occur in a calculation range that is set with reference to the pixel of interest.

7. The image processing apparatus according to claim 6, wherein
if the pixel value of the pixel of interest is smaller than the standard value, the calculation unit is configured to calculate the reference value by adding the feature data to the pixel value of the pixel of interest.

8. The image processing apparatus according to claim 6, wherein
if the pixel value of the pixel of interest is larger than the standard value, the calculation unit is configured to calculate the reference value by subtracting the feature data from the pixel value of the pixel of interest.

9. The image processing apparatus according to claim 6, wherein
the calculation unit is configured to calculate the pixel value of the pixel of interest as the reference value.

10. The image processing apparatus according to claim 2, further comprising an operating unit configured to receive an input of a selection signal for selecting one of a noise reduction mode to preferentially reduce noise of the pixel of interest and an overcorrection prevention mode to prevent excessive correction of the pixel of interest, wherein
the calculation unit is configured to:
calculate the reference value by adding the feature data to the pixel value of the pixel of interest if the selection signal input from the operating unit indicates the noise reduction mode; and
calculate the reference value by subtracting the feature data from the pixel value of the pixel of interest if the selection signal input from the operating unit indicates the overcorrection prevention mode.

11. The image processing apparatus according to claim 1, further comprising:
a random noise model information recording unit configured to record a plurality of different random noise models; and
a selector configured to select one of the plurality of different random noise models recorded by the random noise model information recording unit in accordance with a standard value calculated using pixel values of pixels other than the pixel of interest in a calculation range that is set with reference to the pixel of interest, wherein
the estimation unit is configured to estimate the random noise amount in the pixel of interest based on the one of the plurality of different random noise models selected by the selector.

12. The image processing apparatus according to claim 11, wherein
the selector is configured to switch between the plurality of different random noise models based on the standard value calculated using the pixel values of the pixels surrounding the pixel of interest and based on the pixel value of the pixel of interest.

13. The image processing apparatus according to claim 11, wherein
the selector is configured to switch between the plurality of different random noise models based on the standard value calculated using the pixel values of the pixels where the blinking defect noise does not occur, the pixels surrounding the pixel of interest, and based on the pixel value of the pixel of interest.

14. The image processing apparatus according to claim 1, wherein
the correction unit is configured to determine whether or not to correct the pixel value of the pixel of interest based on the pixel value of the pixel of interest and the random noise amount estimated by the estimation unit.

15. The image processing apparatus according to claim 14, wherein
the correction unit is configured to:
calculate a representative value based on pixel values of pixels surrounding the pixel of interest and the random noise amount estimated by the estimation unit; and
correct the pixel value of the pixel of interest using the representative value.

16. The image processing apparatus according to claim 1, wherein
the feature data is one of a noise level of the blinking defect noise and a value calculated based on a noise level.

17. The image processing apparatus according to claim 1, wherein
the blinking defect noise is random telegraph signal noise.

18. An image processing method executed by an image processing apparatus for correcting blinking defect noise contained in image data generated by an image sensor, the image sensor comprising: a plurality of pixels arranged two-dimensionally and configured to receive light to generate a signal in accordance with an amount of the received light; and a plurality of reading circuits configured to read the signal as a pixel value, the method comprising:
acquiring noise information that is defined by associating positional information of the plurality of reading circuits or positional information of each of the plurality of pixels with feature data related to the blinking defect noise caused by the plurality of reading circuits;

estimating a random noise amount in a pixel of interest based on the feature data and a random noise model for estimating the random noise amount in the pixel of interest; and correcting a pixel value of the pixel of interest based on the random noise amount.

19. A non-transitory computer-readable recording medium with an executable program stored thereon to be executed by an image processing apparatus an image processing apparatus for correcting blinking defect noise contained in image data generated by an image sensor, the image sensor comprising: a plurality of pixels arranged two-dimensionally and configured to receive light to generate a signal in accordance with an amount of the received light; and a plurality of reading circuits configured to read the signal as a pixel value, the program causing the image processing apparatus to execute:

acquiring noise information that is defined by associating positional information of the plurality of reading circuits or positional information of each of the plurality of pixels with feature data related to the blinking defect noise caused by the plurality of reading circuits;

estimating a random noise amount in a pixel of interest based on the feature data and a random noise model for estimating the random noise amount in the pixel of interest; and correcting a pixel value of the pixel of interest based on the random noise amount.

* * * * *